(12) United States Patent
Kim et al.

(10) Patent No.: US 8,825,209 B2
(45) Date of Patent: Sep. 2, 2014

(54) METHOD AND APPARATUS TO PLAN MOTION PATH OF ROBOT

(75) Inventors: Myung Hee Kim, Suwon-si (KR); Kyung Shik Roh, Seongnam-si (KR); San Lim, Suwon-si (KR); Bok Man Lim, Seoul (KR); Guo Chunxu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 155 days.

(21) Appl. No.: 12/805,271

(22) Filed: Jul. 21, 2010

(65) Prior Publication Data

US 2011/0035050 A1 Feb. 10, 2011

(30) Foreign Application Priority Data

Aug. 10, 2009 (KR) ........................ 10-2009-0073258

(51) Int. Cl.
*B25J 9/16* (2006.01)

(52) U.S. Cl.
USPC ........... 700/246; 700/245; 700/250; 701/411; 701/533; 701/408; 701/301; 318/568.15; 318/568.18

(58) Field of Classification Search
CPC ........ B25J 9/161; B25J 9/1664; B25J 9/1671; G05B 2219/40479; G06F 3/0614
USPC ............ 700/253, 245, 141, 247, 255; 701/22, 701/25, 408, 411, 455, 533
See application file for complete search history.

(56) References Cited

U.S. PATENT DOCUMENTS

| | | | |
|---|---|---|---|
| 2004/0078109 A1* | 4/2004 | Babikian et al. | 700/121 |
| 2005/0216181 A1* | 9/2005 | Estkowski et al. | 701/200 |
| 2008/0007193 A1* | 1/2008 | Jones et al. | 318/568.12 |
| 2010/0017026 A1* | 1/2010 | Fletcher et al. | 700/245 |
| 2010/0204828 A1* | 8/2010 | Yoshizawa et al. | 700/245 |

OTHER PUBLICATIONS

Kuffner et al. "An Integrated Approach to Inverse Kinematics and Path Planning for Redundant Manipulators" Proceedings U of the 2006 IEEE International Conference on Robotics and Automation May 2006 file titled: Bertram.pdf.*

LaVelle et al. "Motion Planning for Highly Constricted Spaces" Department of Computer Science, University of Illinois, July V 2008 file titled: Motion Planning_LaVelle.pdf.*

Planning Algorithms, Steven M. LaValle, published by Cambridge University Press 2006 http://planning.cs.uiuc.edu/.*

* cited by examiner

*Primary Examiner* — Helal A Algahaim
*Assistant Examiner* — Jelani Smith
(74) *Attorney, Agent, or Firm* — Staas & Halsey LLP

(57) ABSTRACT

If a manipulator of a robot falls in local minima when expanding a node to generate a path, the manipulator may efficiently escape from local minima by any one of a random escaping method and a goal function changing method or a combination thereof to generate the path. When the solution of inverse kinematics is not obtained due to local minima or when the solution of inverse kinematics is not obtained due to an inaccurate goal function, an optimal motion path to avoid an obstacle may be efficiently searched for. The speed to obtain the solution may be increased and thus the time consumed to search for the optimal motion path may be shortened.

7 Claims, 41 Drawing Sheets

(a)

(b)

METHOD AND APPARATUS TO PLAN MOTION PATH OF ROBOT

CROSS-REFERENCE TO RELATED APPLICATIONS

This application claims the benefit of Korean Patent Application No. 2009-0073258, filed on Aug. 10, 2009 in the Korean Intellectual Property Office, the disclosure of which is incorporated herein by reference.

BACKGROUND

1. Field

Embodiments relate to a method and apparatus to plan a motion path of a robot, which is not obstructed by an obstacle in a working environment.

2. Description of the Related Art

In general, a mechanical device which performs motions similar to human motion using an electrical or magnetic mechanism is called a robot. Early robots included manipulators used for automated or unmanned tasks of manufacturing plants or industrial robots, such as transportation robots, and performed dangerous tasks, simply repeated tasks or tasks using large force in place of a human. Recently, research into a humanoid robot which has joints similar to those of a human, coexists with a human in a working and living space of the human and provides various services has been actively conducted.

Such a humanoid robot performs tasks using a manipulator which may move similarly to the arm or hand motion of a human by an electrical or mechanical mechanism. In most manipulators which are currently being used, several links are connected to each other. A connection portion between the links is called a joint. The motion characteristics of the manipulator are determined according to a geometrical relationship. Mathematical representation of such a geometrical relationship is called kinematics. In general, the manipulator moves an end effector of a robot with such kinematic characteristics in a direction (goal point) to perform a task.

In order to allow the manipulator to perform a given task (e.g., grasp an object), it is important to generate a motion path from an initial position (start point) before the manipulator performs a task to a final position (goal point) where the task may be performed, that is, an object may be grasped. The path in which the manipulator may move from the start point to the goal point without colliding with an obstacle within a working area is automatically generated by an algorithm. The method of generating the path is divided into a process of searching for a free space which does not cause collision with an obstacle and a process of planning the motion path of the manipulator in the free space.

Hereinafter, in a sampling-based path planning algorithm which plans an optimal path to connect given start and goal points while satisfying constraints such as obstacle avoidance, a method of using a Rapidly-exploring Random Tree (RRT) algorithm in a situation with a high degree of freedom or complicated constraints will be described.

The RRT algorithm is a method of repeating a process of selecting a closest node from an initial start point using a randomly sampled configuration in a Configuration Space (C-Space) in which the manipulator performs a task to expand a tree, and searching for a motion path to a final goal point. In this case, a goal function is a function of a distance from the goal point to an end-effector and a directional vector, and a node having a smallest goal score is selected from the tree to expand the tree.

However, since a known RRT algorithm depends on the goal score when the closest node is selected to expand the tree reaching the final goal point, a solution may not be obtained due to local minima if the goal function is not accurately set.

SUMMARY

Therefore, it is an aspect of the at least one embodiment to provide a method and apparatus to plan a path of a robot, which improves the performance of a path plan by changing a goal function so as to efficiently escape from local minima when falling in local minima.

Additional aspects of the at least one embodiment will be set forth in part in the description which follows and, in part, will be obvious from the description, or may be learned by practice of the invention.

The foregoing and/or other aspects are achieved by providing a method of planning a path of a robot, the method including forming a configuration space having information about a start point, a goal point, constraints and a goal function, expanding a tree using a certain point selected in the configuration space and a node having a smallest goal score in the tree, and planning the path of a manipulator, the method including: determining whether local minima occur when the tree is expanded using a processor; selecting a certain point when the local minima occur using the processor; selecting a node closest to the certain point in the tree using the processor; and obtaining a sample satisfying the constraints and a predetermined goal score condition in a line between the certain point and the selected node, adding the obtained sample to the tree, and expanding the tree having the added obtained sample using the processor.

The determining of whether the local minima occur may include determining whether a goal score of a next node is greater than that of a previous node, and determining that the local minima occur when a number of times of repeating determining that a goal score of a next node is greater than that of a previous node is equal to or greater than a predetermined number.

The obtaining of the sample satisfying the predetermined goal score may include comparing the goal score of the sample with the goal score of the previous node and determining that the sample satisfies the predetermined goal score condition if the goal score of the sample is less than that of the previous node.

The foregoing and/or other aspects are achieved by providing a method of planning a path of a robot, the method including forming a configuration space having information about a start point, a goal point, constraints and a goal function, expanding a tree using a certain point selected in the configuration space and a node having a smallest goal score in the tree, and planning the path of a manipulator of the robot, the method including: determining whether local minima occur when the tree is expanded using a processor; changing the goal function to a new goal function when the local minima occur using the processor; applying the changed goal function and selecting a node having a smallest goal score in the tree using the processor; selecting a certain point; and obtaining a sample satisfying the constraints and a predetermined goal score condition in a line between the certain point and the selected node, adding the obtained sample to the tree, and expanding the tree, using the processor.

The changing of the goal function may include at least one of changing a directional vector having a predetermined angle between an obstacle and a goal point so as to change the goal function, and changing a directional vector having a predetermined angle between the goal point and an end effector of the manipulator falling in the local minima so as to change the goal function.

The foregoing and/or other aspects are achieved by providing an apparatus to plan a motion path of a robot, the apparatus forming a configuration space having information about a start point, a goal point, constraints and a goal function, expanding a tree using a certain point selected in the configuration space and a node having a smallest goal score in the tree, and planning the path of a manipulator, the apparatus including: a path plan generator using a processor to determine whether local minima occur when the tree is expanded, to select the certain point when the local minima occur, to select a node closest to the certain point in the tree, and to obtain a sample satisfying the constraints and a predetermined goal score condition in a line between the certain point and the selected node to add the obtained sample to the tree such that the tree having the obtained sample added is expanded.

The foregoing and/or other aspects are achieved by providing an apparatus to plan a path of a robot, the apparatus forming a configuration space having information about a start point, a goal point, constraints and a goal function, expanding a tree using a certain point selected in the configuration space and a node having a smallest goal score in the tree, and planning the path of a manipulator, the apparatus including: a path plan generator using a processor to determine whether local minima occur when the tree is expanded, to change the goal function to a new goal function when the local minima occur, to apply the changed goal function to select a node having a smallest goal score in the tree, to select the certain point in the configuration space, and to obtain a sample satisfying the constraints and a predetermined goal score condition in a line between the certain point and the selected node to add the obtained sample to the tree such that the tree having the obtained sample added is expanded.

If the manipulator falls in local minima, the manipulator may efficiently escape from local minima by any one of a random escaping method and a goal function changing method or a combination thereof to obtain a solution. When the solution of inverse kinematics is not obtained due to local minima or when the solution of inverse kinematics is not obtained due to an inaccurate goal function, an optimal motion path to avoid an obstacle may be efficiently searched for. The velocity to obtain the solution may be increased and thus the time consumed for searching for the optimal motion path may be shortened.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
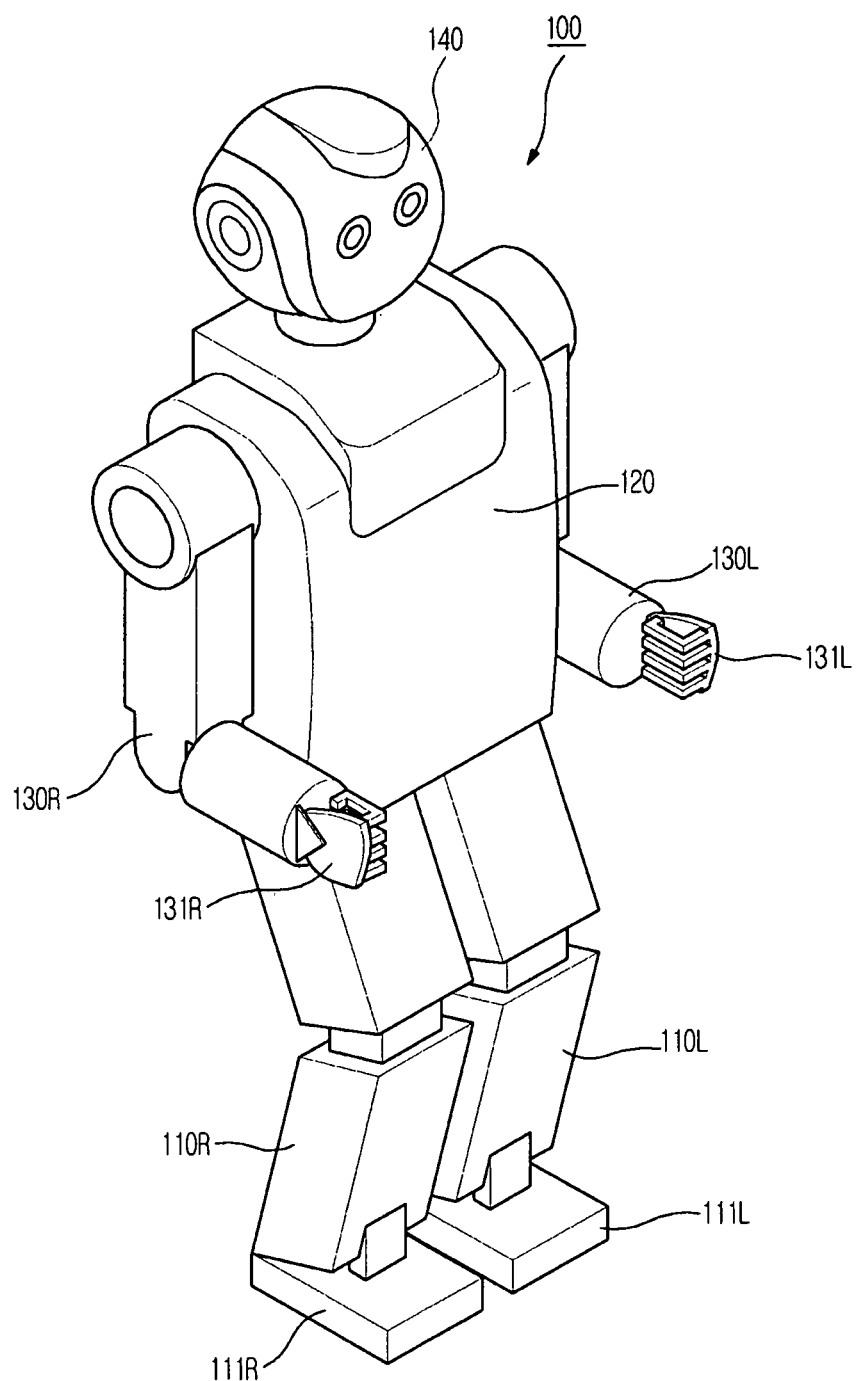
FIG. 1 is an appearance view showing an example of a robot according to at least one embodiment.

Reference will now be made in detail to the at least one embodiment, examples of which are illustrated in the accompanying drawings, wherein like reference numerals refer to like elements throughout.

FIG. 1 is an appearance view showing an example of a robot according to an embodiment.

In FIG. 1, the robot 100 according to the embodiment is a bipedal robot which walks erect using two legs 110R and 110L similar to a human, and includes a trunk 120, two arms 130R and 130L and a head 140 mounted on an upper side of the trunk 120, and feet 111R and 111L and hands 131R and 131L respectively mounted on the front ends of the two legs 110R and 110L and the arms 130R and 130L. In reference numerals, R and L denote right and left, respectively.

Figure 2:
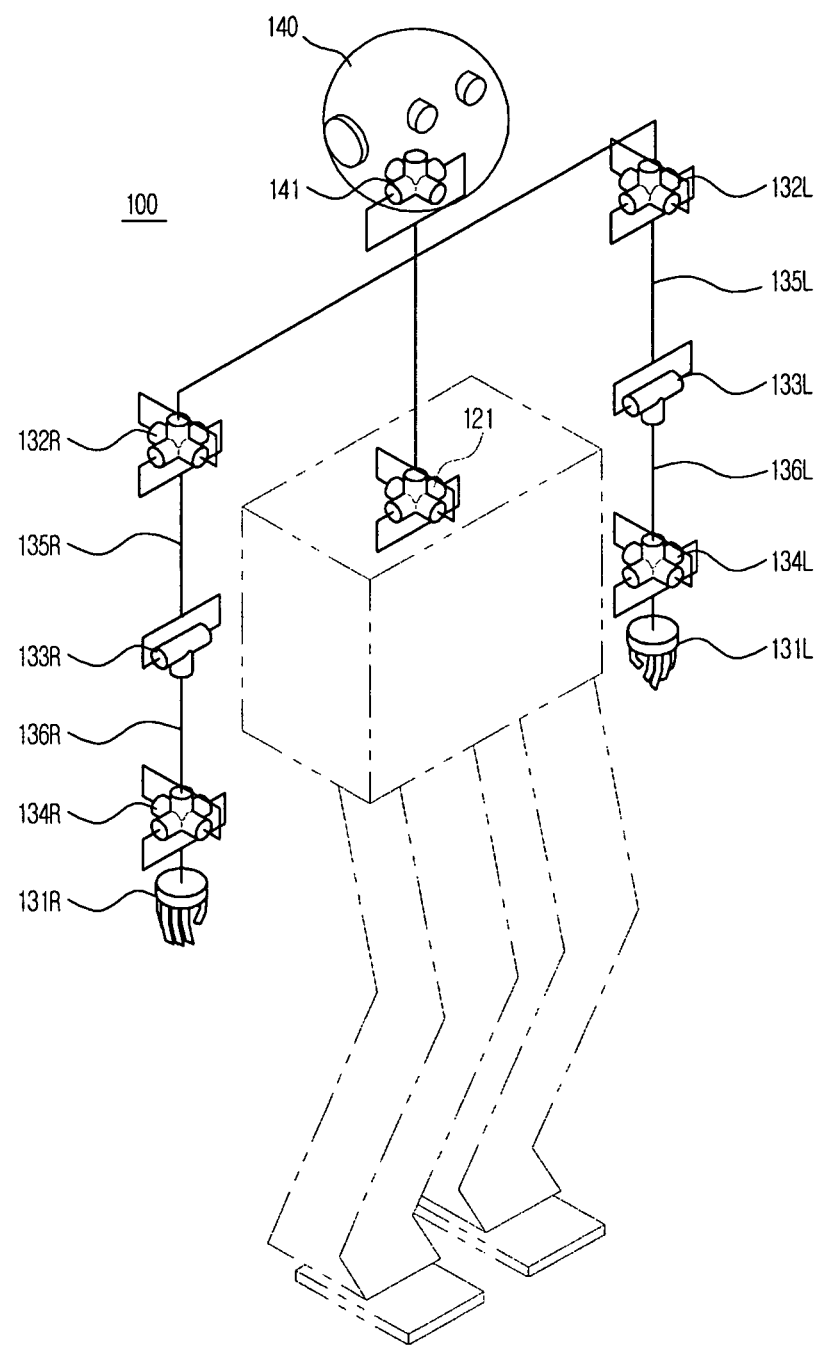
FIG. 2 is a view showing the structure of the main joints of the robot shown in FIG. 1.

FIG. 2 is a view showing the structure of the main joints of the robot shown in FIG. 1.

In FIG. 2, the two arms 130R and 130L respectively include shoulder joints 132R and 132L, elbow joints 133R and 133L and wrist joints 134R and 134L such that the portions corresponding to the shoulders, the elbows and the wrists of the robot 100 rotate. The shoulder joints 132R and 132L are located on both ends of the upper side of the trunk 120.

The shoulder joints 132R and 132L of the arms 130R and 130L may move in an x-axis (roll axis), a y-axis (pitch axis) and a z-axis (yaw axis), the elbow joints 133R and 133L may move in the y-axis (pitch axis), and the wrist joints 134R and 134L may move in the x-axis (roll axis), the y-axis (pitch axis) and the z-axis (yaw axis).

The two arms 130R and 130L respectively include upper links 135R and 135L to connect the shoulder joints 132R and 132L and the elbow joints 133R and 133L and lower links 136R and 136L to connect the elbow joints 133R and 133L and the wrist joints 134R and 134L so as to move with a predetermined degree of freedom according to the movable angle ranges of the joints 132R and 132L, 133R and 133L, and 134R and 134L.

The trunk 120 connected to the two legs 110R and 110L includes a waist joint 121 to rotate the waist portion of the robot 100, and the head 140 connected to the trunk 120 includes a neck joint 141 to rotate a neck portion of the robot 100.

In at least one embodiment, the two arms 130R and 130L configure a manipulator 130 to perform a motional task, and the two hands 131R and 131 provided on the front end of the manipulator 130 configure an end effector 131 to grasp a goal (object). These are shown in FIG. 3.

Figure 3:
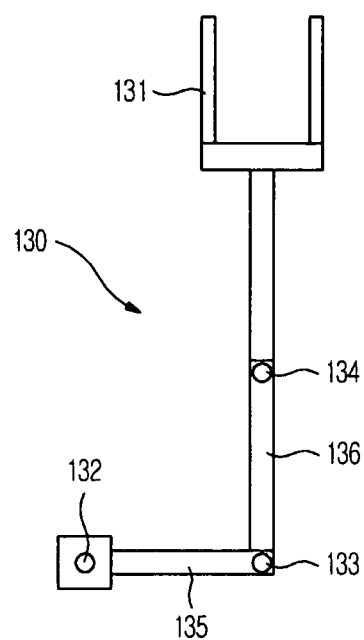
FIGS. 3(*a*) and 3(*b*) are views schematically showing the configuration of a kinematic redundant actuation manipulator of a robot according to at least one embodiment.
Figure 3:
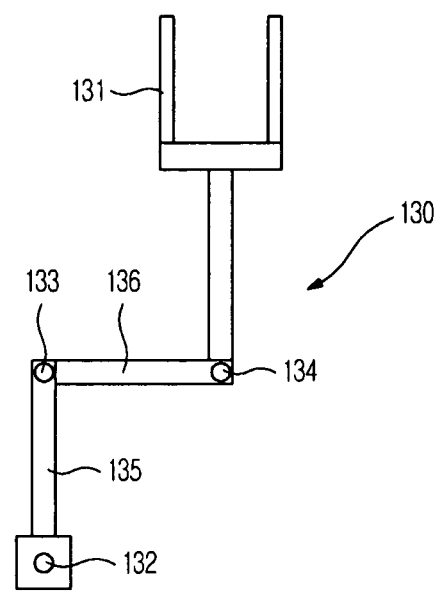

FIG. 3 is a view schematically showing the configuration of a kinematic redundant actuation manipulator of a robot according to an embodiment.

In FIG. 3, the manipulator 130 is manufactured so as to move similar to the arm or hand motion of a human by an electrical or mechanical mechanism. In most manipulators 130 which are currently being used, several links (in detail, an upper link or a lower link) are connected to each other by several joints (in detail, shoulder joints, elbow joints or wrist joints). The motional characteristics of the manipulator 130 are determined according to a geometrical relationship between the links and the joints. Mathematical representation of such a geometrical relationship is kinematics. In general, the manipulator moves the end effector 131 with such kinematic characteristics in a direction to perform a task. The manipulator 130 according to the embodiment moves the end effector 131 to a goal point to grasp an object using links, the positions and directions of which are adjusted.

As shown in FIG. 3, the shape of the manipulator 130 which moves to the goal point in order to grasp the same object may be variously changed as shown in FIG. 3(a) or 3(b).

Figure 4:
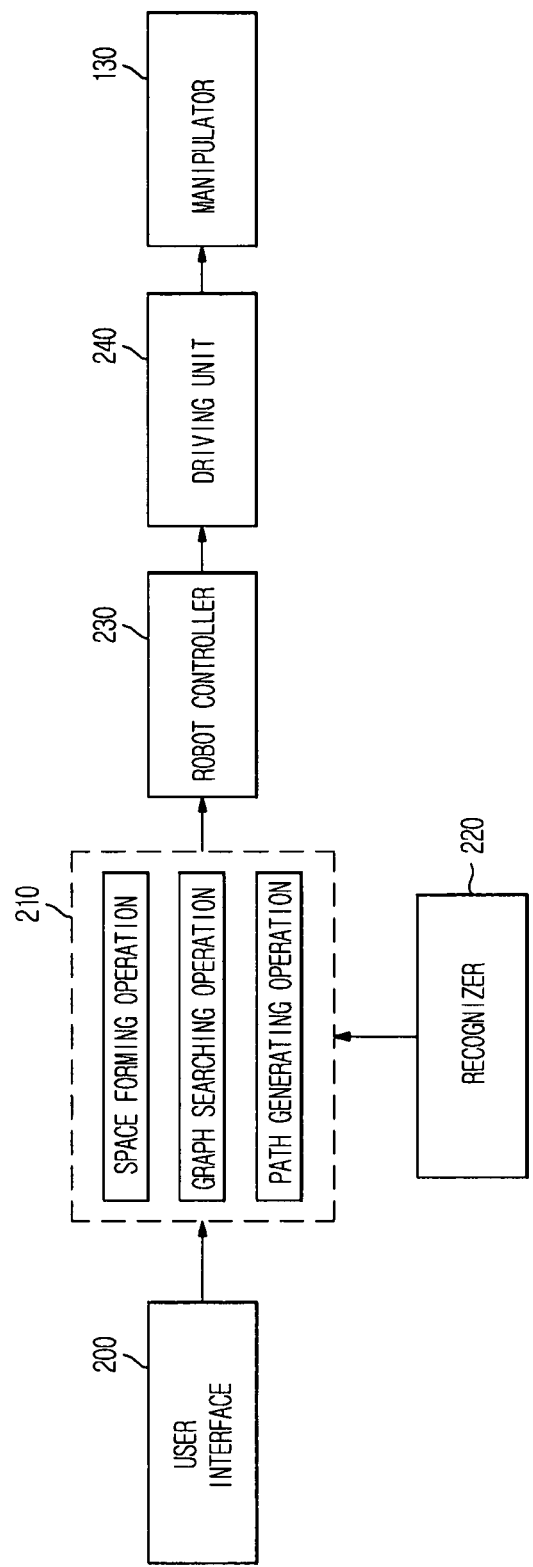
FIG. 4 is a control block diagram of an apparatus to plan a motion path of a manipulator in a robot according to at least one embodiment.

FIG. 4 is a control block diagram of an apparatus to plan a motion path of a manipulator in a robot according to an embodiment, which includes a user interface unit 200, a path planning generator 210, a recognizer 220, a robot controller 230, and a driving unit 240.

The user interface unit 200 allows a user to input a task command (e.g., a grasping command to grasp an object placed on a table) of the robot and, more particularly, the manipulator 130 by manipulating a switch or via voice, for example, but is not limited to these examples and may be any type of input device.

The path planning generator 210 generates and sends a path plan to control the movement of the manipulator 130 according to the task command input via the user interface unit 200 to the robot controller 230. A method of generating a path plan by the path plan generator 210 includes a space forming operation, a graph searching operation and a path generating operation.

In the space forming operation, a Configuration Space (C-Space) to generate a collision avoidance path is detected. The term "configuration" refers to a set of variables to represent the position and the direction of the moving manipulator 130, and all spaces occupied by configurations are called the C-Space.

In the graph searching operation, a connected network representing a searchable path to generate an optimal path is generated. Configurations are randomly extracted based on the C-Space formed by a cell decomposition method such as a tree with respect to the moving manipulator 130, nodes are generated by a method of excluding a configuration colliding with an obstacle space, and a search tree to connect the generated nodes is generated, thereby searching for a search graph to generate a path.

In the path generation operation, an obstacle space is avoided so as not to cause collision in the connected network of the given search space, and an optimal path connected between a start point and a goal point is generated.

The recognizer 220 recognizes information which is given in order to perform a task command, that is, a configuration (start point) at an initial position of the manipulator 130 before performing the task command, a configuration (goal point) at a goal point of the manipulator 130 where the task command may be performed, and obstacles between the start point and the goal point, in the C-Space, and sends the information to the path planning generator 210. This recognized information is used to plan the motion path of the manipulator 130 by the path planning generator 210.

The robot controller 230 controls the driving unit 240 according to the path plan received from the path planning generator 210, drives the manipulator 130, and controls the movement of the manipulator 130.

Hereinafter, the robot having the above-described structure, the method of planning the path thereof, and the effects thereof will be described.

Figure 5:
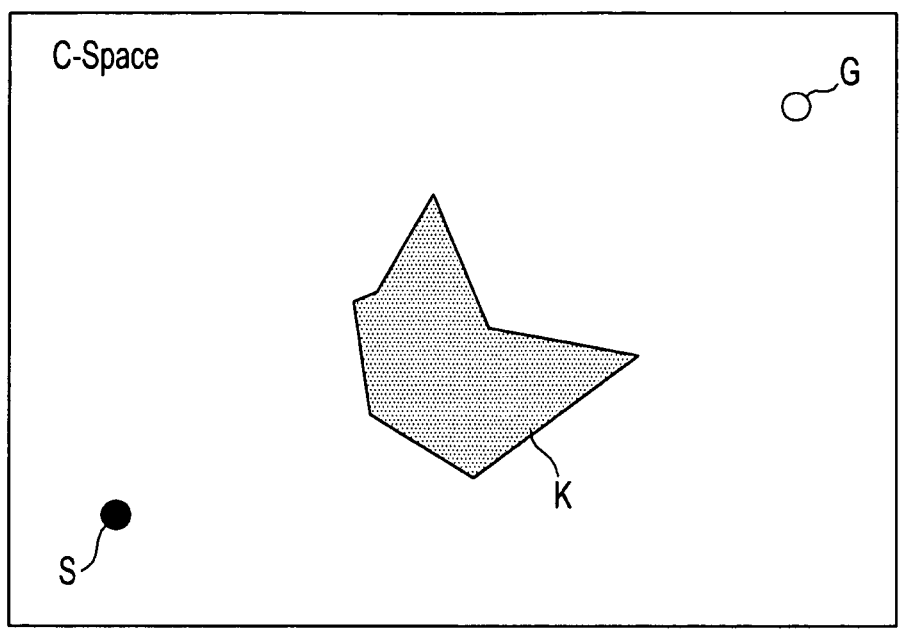
FIG. 5 is a view showing a Configuration Space (C-Space) according to an embodiment.

FIG. 5 is a view showing a C-Space according to an embodiment.

In FIG. 5, the C-Space refers to a dynamic space where the manipulator 130 performs a task, S denotes a start point in which the configuration at the initial position before performing the task is formed by one node in the C-Space, G denotes a goal point in which the configuration at the goal position where the task may be performed, that is, an object, may be grasped, is formed by one node in the C-Space, and K denotes an obstacle in the C-Space between the start point S and the goal point G.

An example of a method of planning a motion path, while satisfying constraints, such as obstacle collision avoidance, includes a sampling based motion planning method.

As such a method, there is a Rapidly Random Tree (RRT) searching method.

A tree expansion method of the RRT is largely divided into a Single-RRT, a Bi-Directional RRT (BI-RRT), and a Best First Search & RRT (BF-RRT). The Single-RRT is used to travel from the initial configuration to the goal configuration. One configuration is randomly selected in the C-Space with the initial configuration, the goal configuration and the constraints, a node closest to the randomly selected configuration is selected, a virtual line is drawn, a sample in the virtual line is included if the sample satisfies the constraints, and the tree is continuously expanded until the sample becomes equal to the goal configuration.

In the Single-RRT, since a certain point is selected and the tree is expanded in order to reach the goal configuration, a relatively large number of nodes are generated and thus a path search speed is decreased. In order to prevent the path search speed from being decreased, in the BI-RRT, the tree is expanded not only in the start configuration but also in the goal configuration (while swapping the tree). If the tree is connected while the tree is expanded, the graph searching algorithm is performed so as to obtain a path.

Both the Single-RRT and the BI-RRT are characterized in that the goal configuration is set. However, in the case of a robot with a redundant degree of freedom, there may be various configurations reaching the goal point (see FIG. 3).

In addition, if a configuration reaching the goal point is a configuration in which collision with an obstacle occurs midway, a path reaching the goal configuration may not be generated.

The BF-RRT refers to a method of satisfying the goal score of the goal point instead of the configuration of the goal point. In this method, inverse kinematics is not initially solved and a sample is expanded so as to reach a final position in the case of a redundant manipulator. The redundant manipulator refers to a robot arm having a higher degree of freedom than that necessary to perform a task in a working space.

Figure 6:
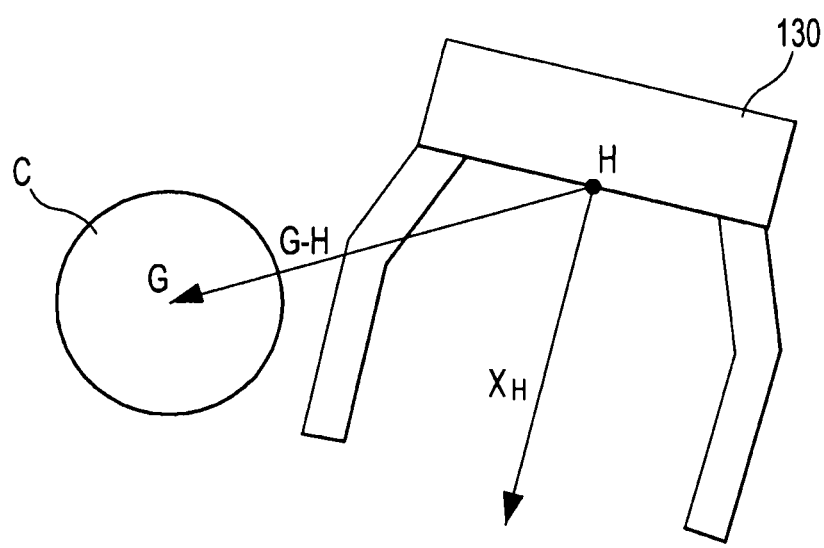
FIG. 6 is a view showing a model of a process of grasping an object by a robot according to at least one embodiment.

As shown in FIG. 6, a goal function which is satisfied when a robot grasps a goal object includes a distance $\|G-H\|$ between a goal point G and the end effector of the robot and a directional vector $|(G-H)*x_H-1|$.

$$\text{Goal Function} = \|G-H\| + \alpha * |(G-H)*x_H-1| \quad \text{Equation 1}$$

where, $\|G-H\|$ denotes the distance from the end effector to the goal point, $|(G-H)*x_H-1|$ denotes the directional vector, and a denotes a constant.

The BF-RRT performs the following operations.

Figure 7:
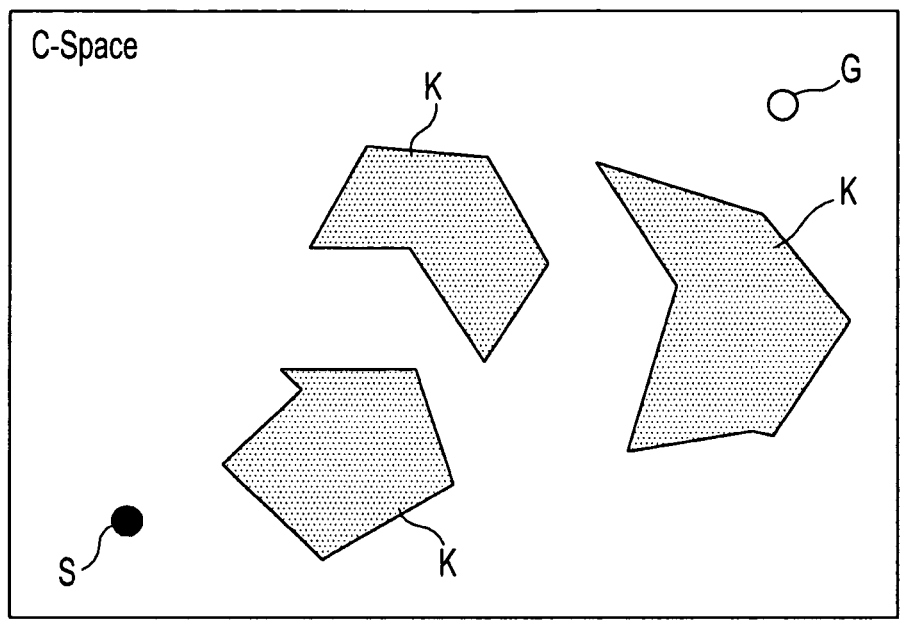
FIGS. 7 to 17 are views showing a method of generating a motion path using a Best First Search & Rapidly Random Tree (BF-RRT) in at least one embodiment.

Operation 0: A C-Space with a goal point S, a goal point G, constraints, and a goal function is formed. The start point S, the goal point G and the constraints to avoid collision with an obstacle K are recognized. In addition, the goal function, which is the function of the distance from the goal point G to the end effector, and the directional vector are recognized. In addition, the C-Space is formed from the start point S, the goal point G, the constraints and the goal function (see FIG. 7).

Operation 1: A certain point is randomly sampled and selected in the C-Space.

Operation 2: A node having a smallest goal score is selected in the tree. In an initial state, the node having the smallest goal score in the tree is the start point S.

Operation 3: The selected node and the certain point are connected. At this time, a new sample is stored only when the goal function is less than a previous goal function.

Figure 8:
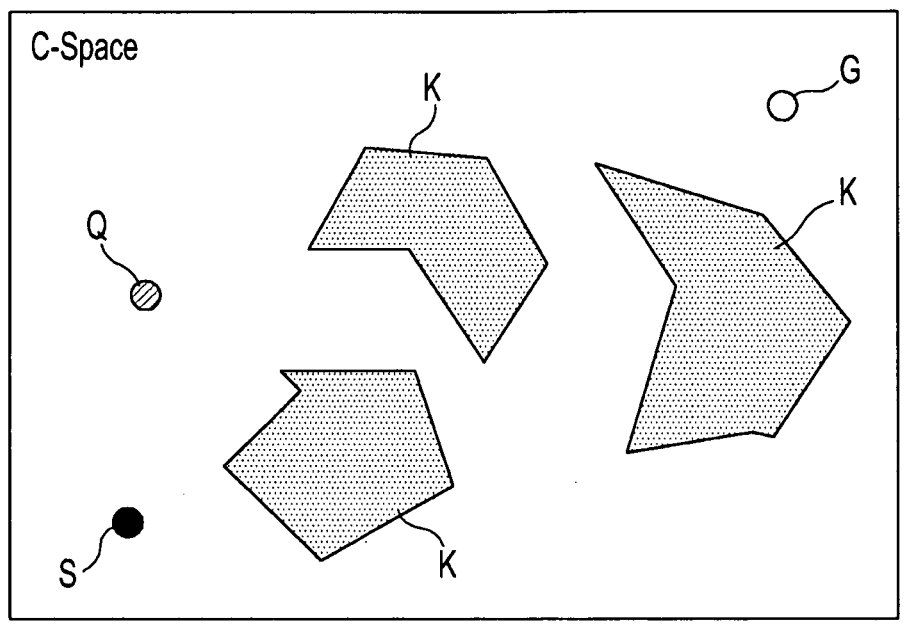
Figure 9:
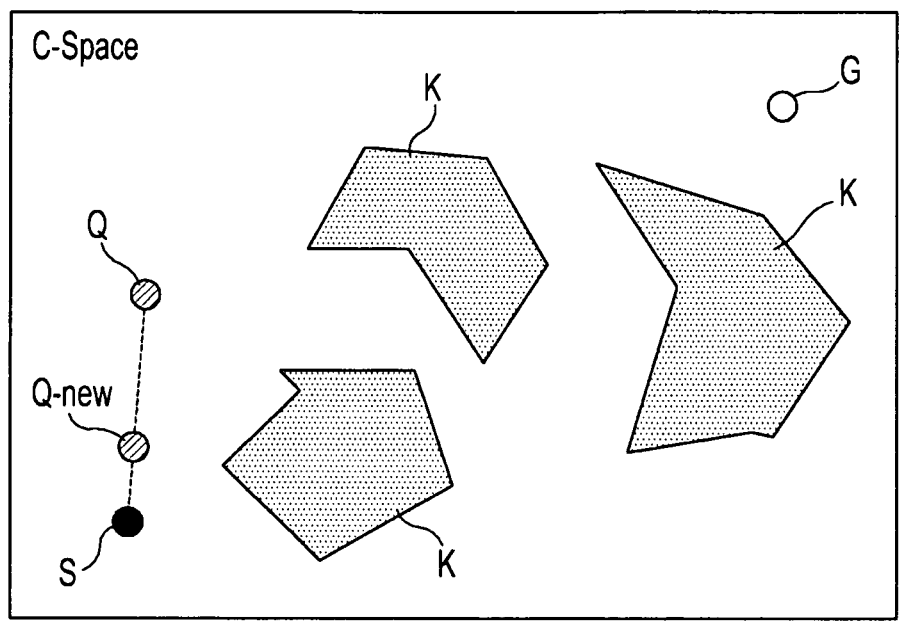
Figure 10:
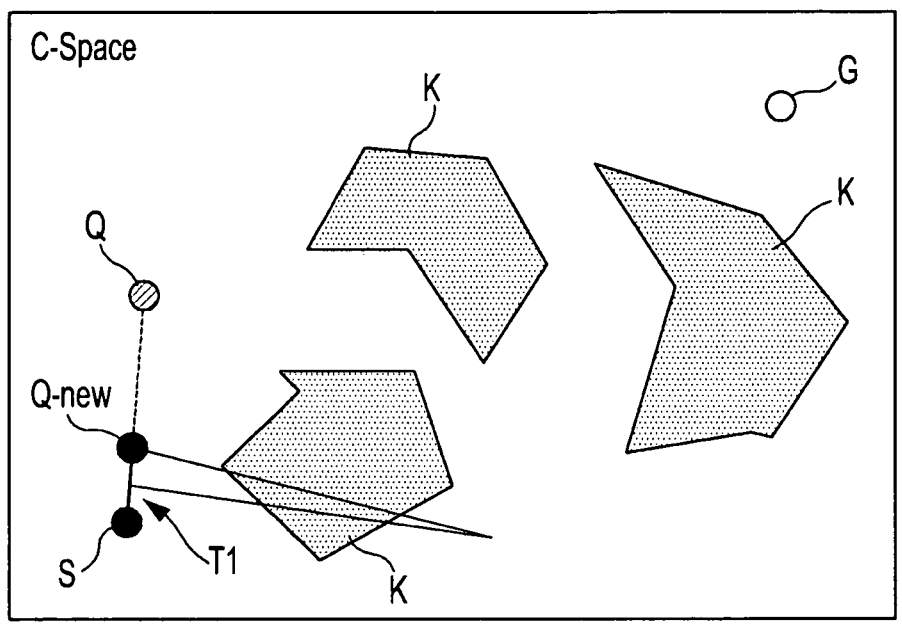
Figure 11:
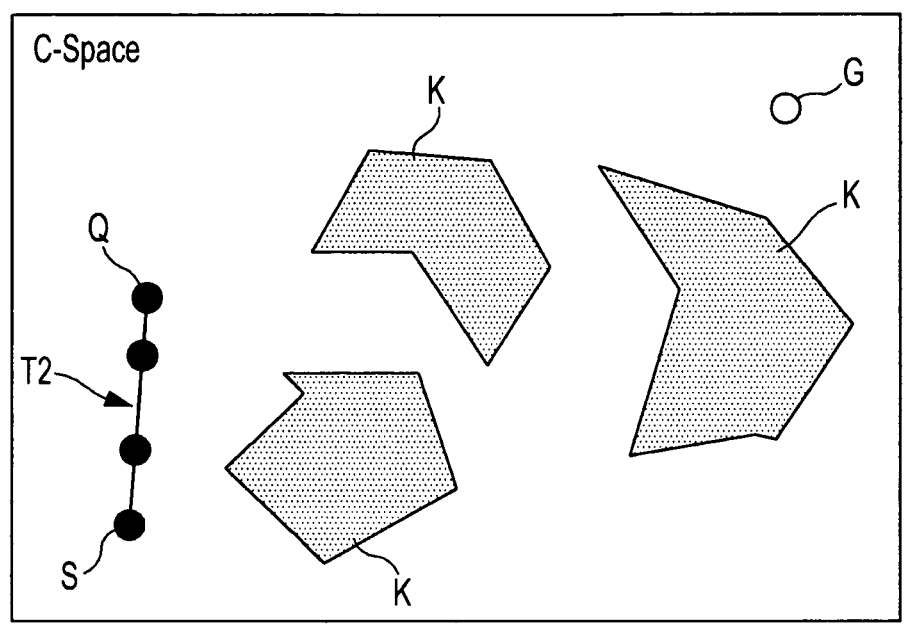
Figure 12:
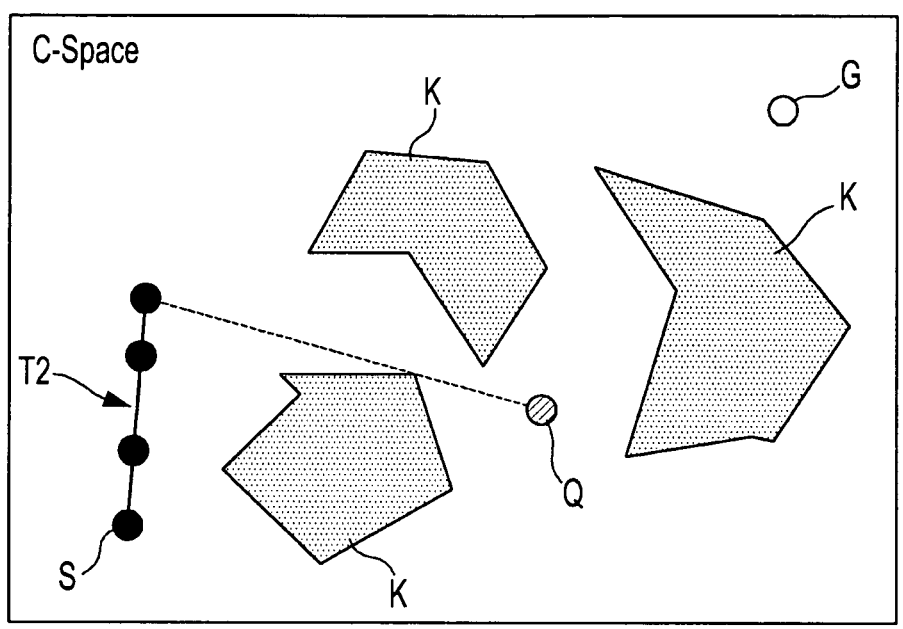
Figure 13:
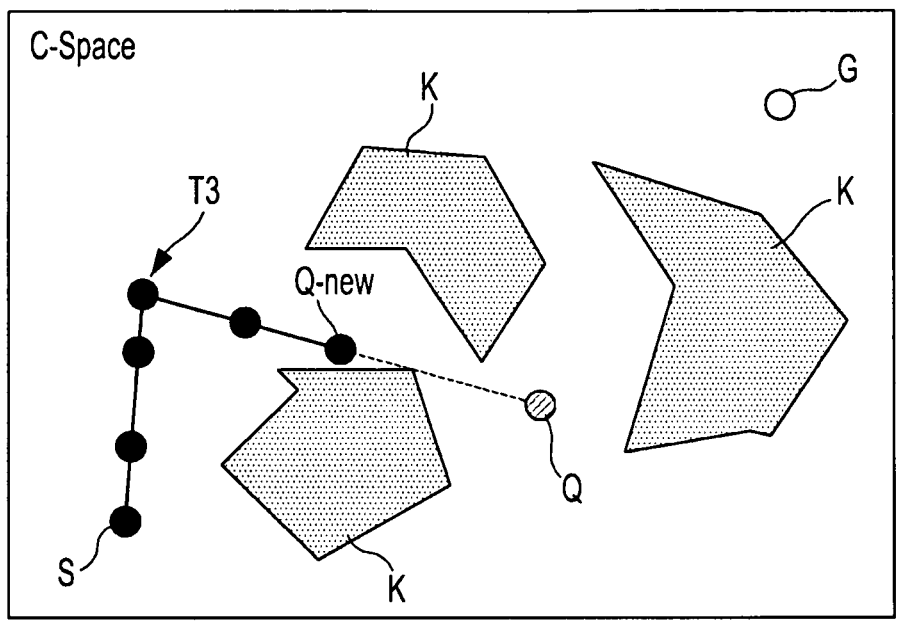
Figure 14:
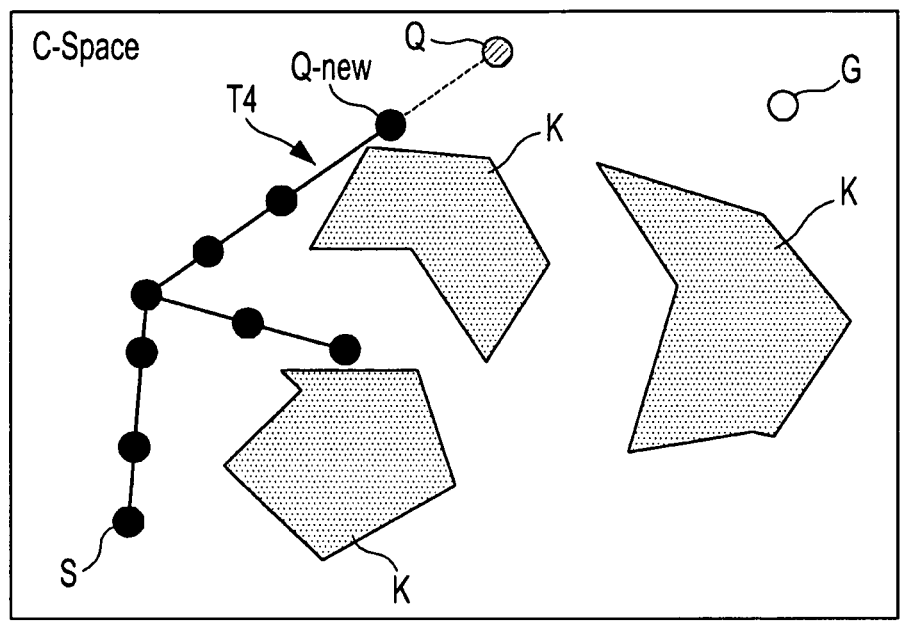
Figure 15:
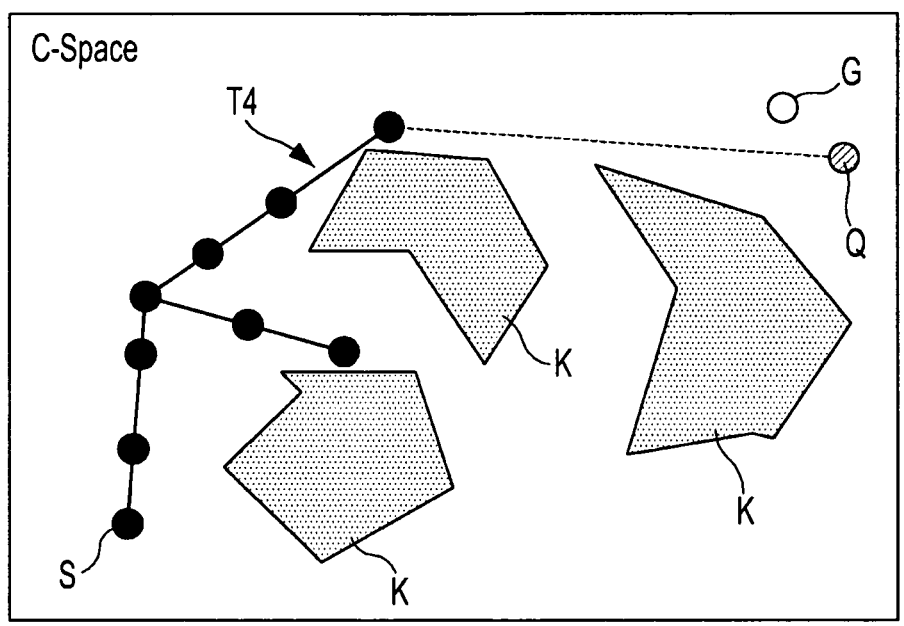

As shown in FIGS. 8 and 9, a certain point Q is sampled (see FIG. 8). A virtual line (dotted line) is connected between the sampled point Q and a node Q-new having a smallest goal score, and a new sample separated from the sampled point by a predetermined distance is then generated (see FIG. 9). Constraints (joint limit, collision avoidance, etc.) and a goal score of the new sample are checked and the sample is added if the constraints and the goal score condition are satisfied (see FIGS. 10 and 11). Such a method is repeatedly performed until a new sample is constantly expanded, such that a tree T1 is expanded to a tree T2.

FIGS. 12 to 15 show operations to repeatedly perform Operations 1, 2 and 3 so as to add new samples to the tree.

Figure 16:
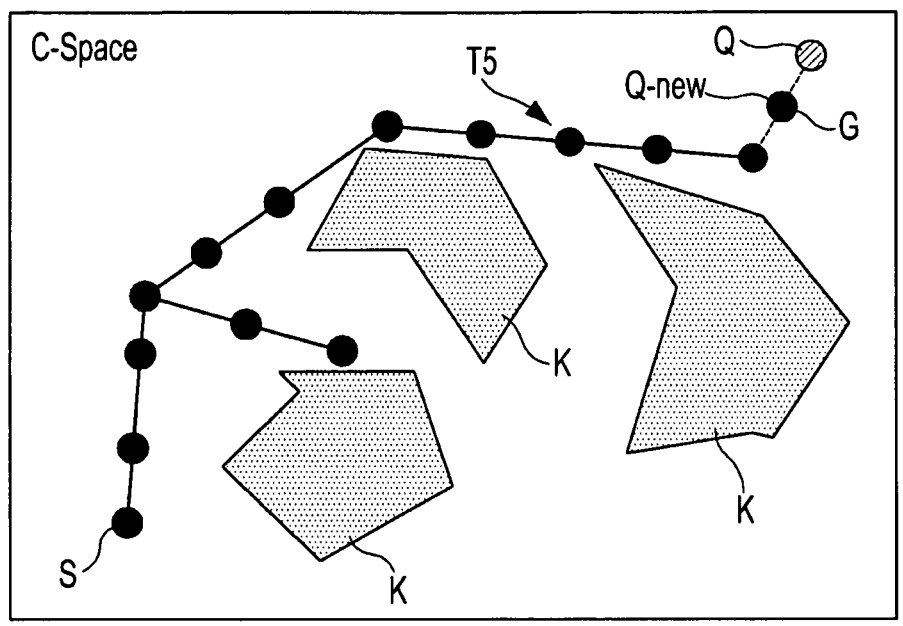
Figure 17:
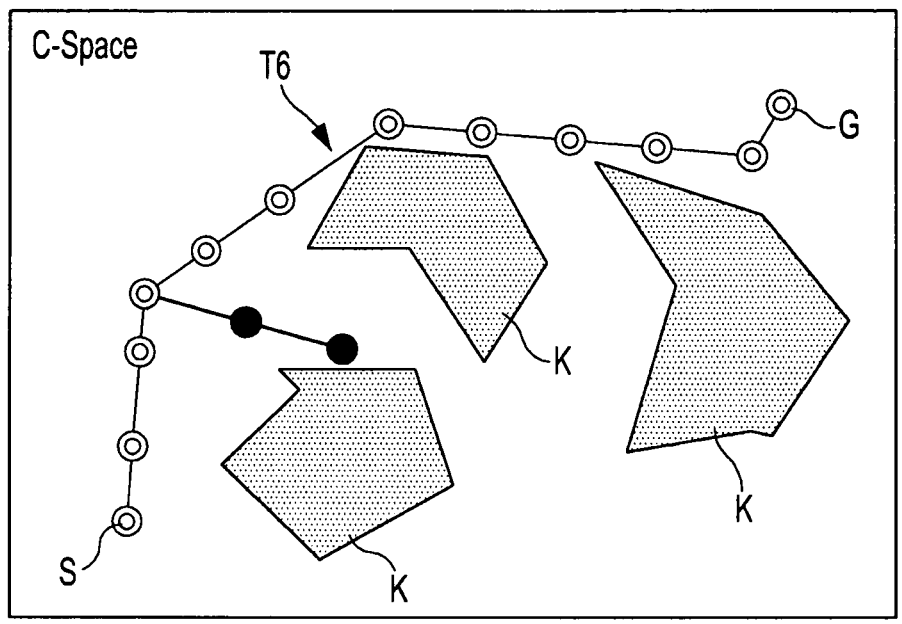
Figure 18:
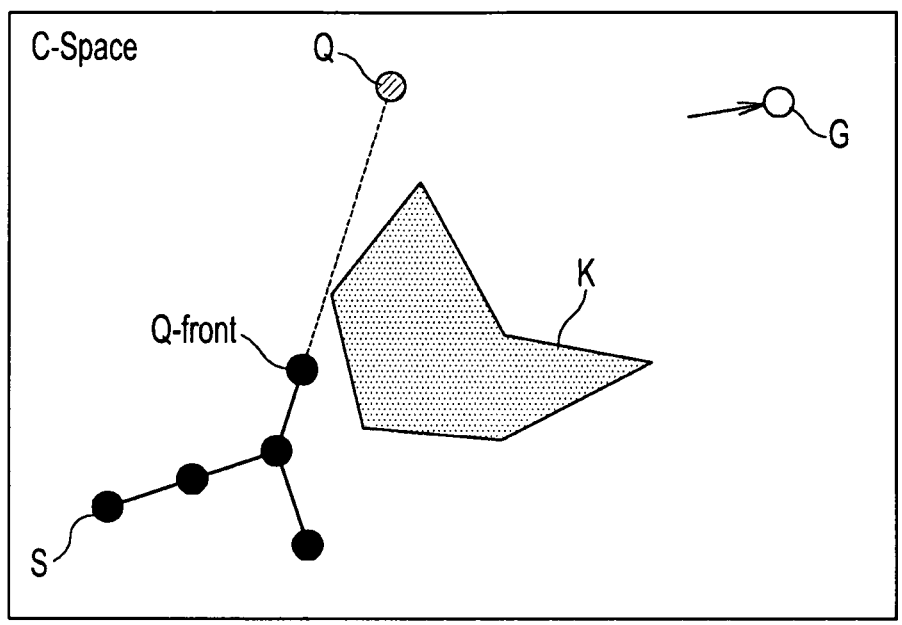
FIGS. 18 to 21 are views showing various local minima situations which may occur in a method of generating a path using an RF-RRT method in at least one embodiment.
Figure 19:
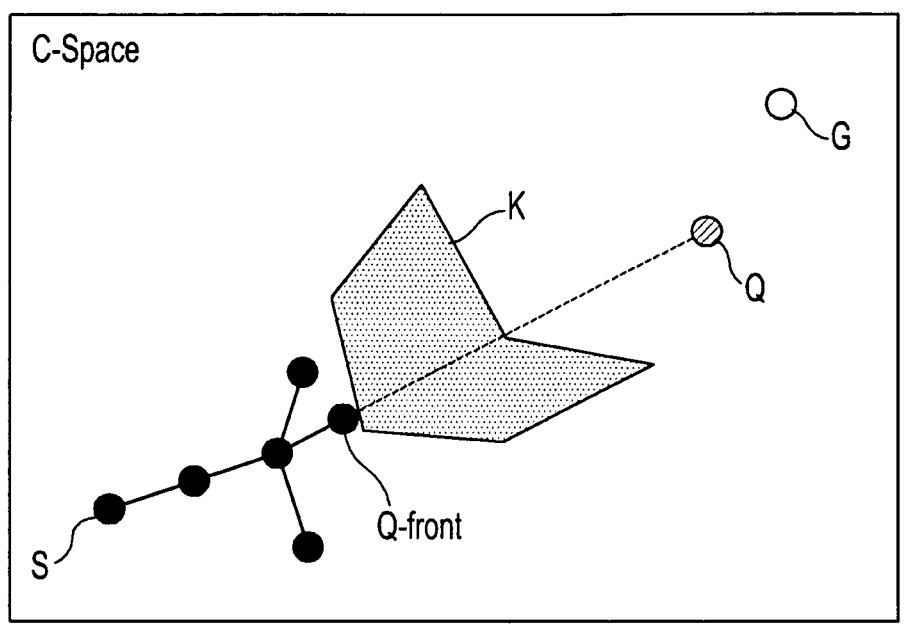
Figure 20:
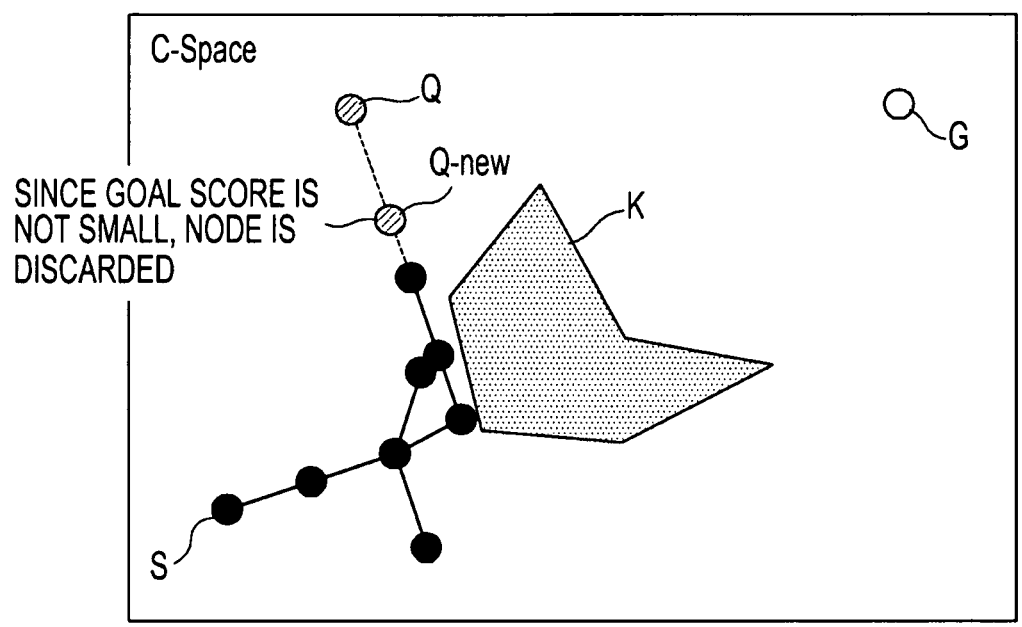
Figure 21:
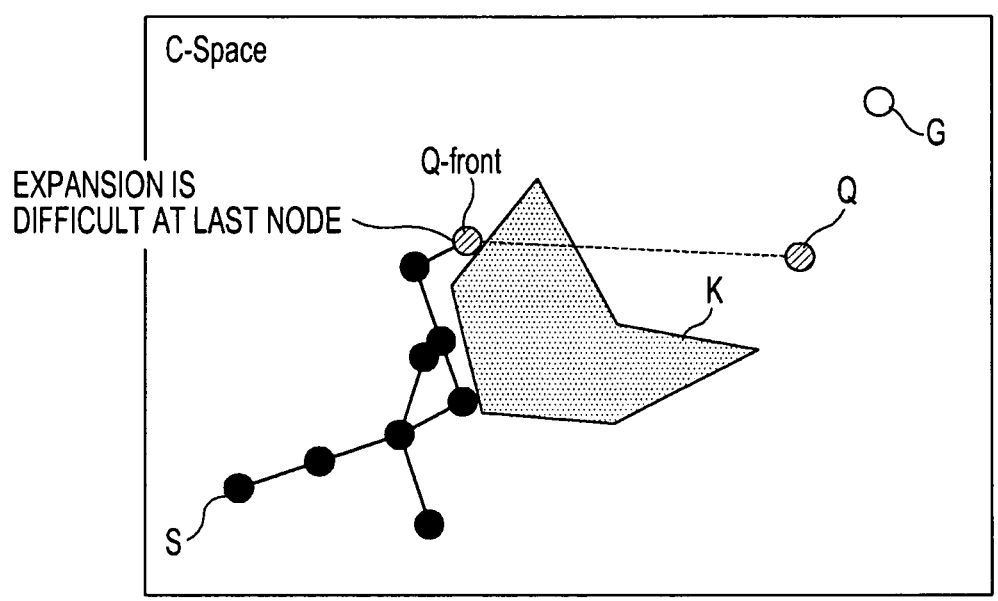

Operation 4: If the expanded node satisfies the goal score condition, it is determined that a final node satisfies the goal function so as to generate a path by graph searching (see FIGS. 16 and 17).

The BF-RRT is advantageous in that a solution may be obtained even when the solution of the inverse kinematics is not present or the solution of the inverse kinematics is present in a path including an obstacle. However, since a point having a smallest goal score is selected so as to expand the tree, local minima may occur if the goal function is not adequately set.

FIGS. 18 to 21 are views showing various local minima which occur while a tree is expanded.

If it is determined that local minima occur while Operations 1 to 3 of the BF-RRT are performed, the Single-RRT method is partially applied. By applying this method, the solution may be obtained when the solution of the inverse kinematics is not obtained, when local minima occur or when the directional vector of the goal function is not accurate.

In more detail, if local minima occur while Operations 1 to 3 of the existing BF-RRT are repeatedly performed, Operation 4: It is determined whether local minima occur.

Operation 5: If it is determined that local minima occur, the existing tree is expanded in a certain direction.

Operation 6: A closest node is selected and is connected to the tree.

Figure 22:
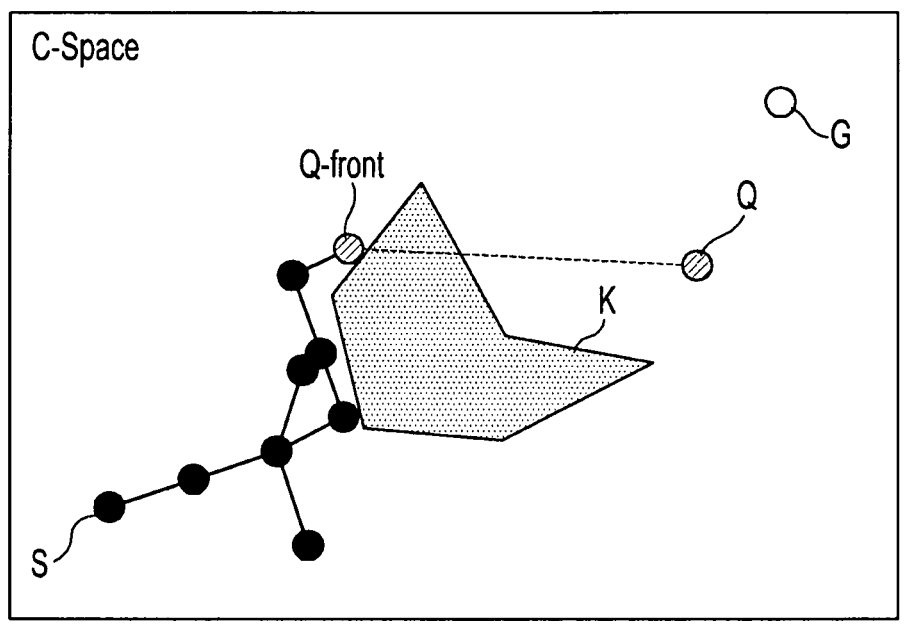
FIGS. 22 to 27 are views showing a method of escaping from local minima and generating a path when falling in local minima in a method of generating a path using an RF-RRT method in at least one embodiment.
Figure 23:
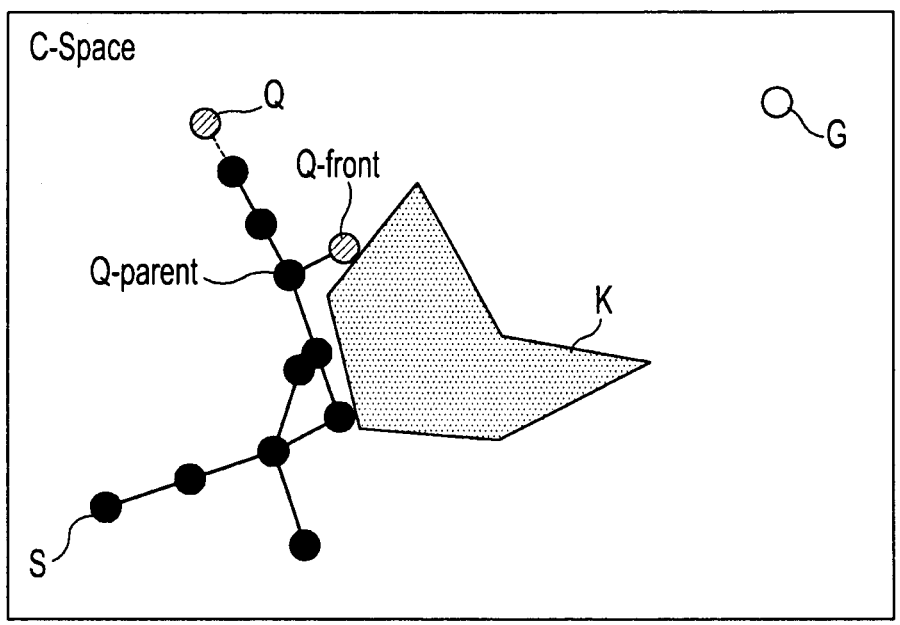
Figure 24:
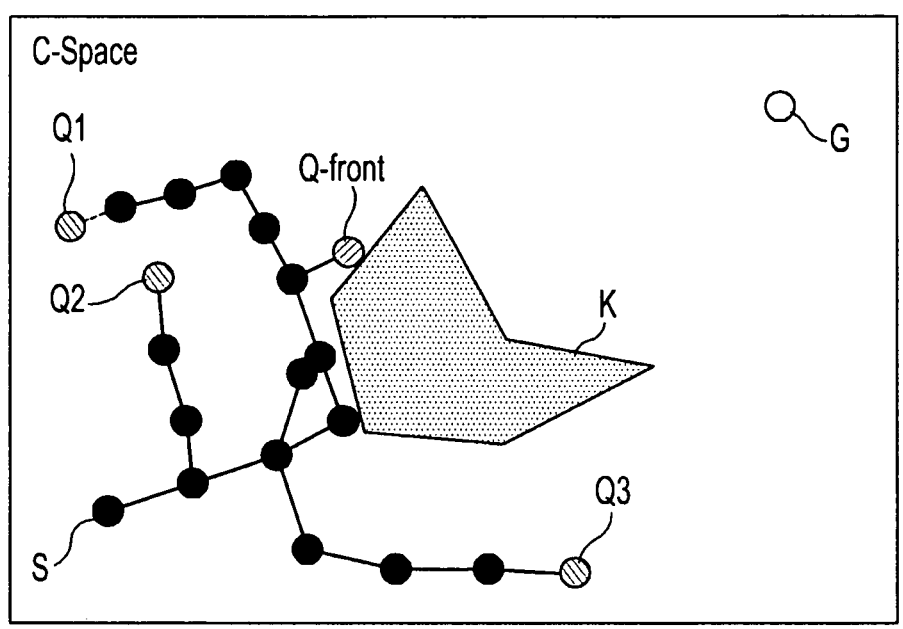
Figure 25:
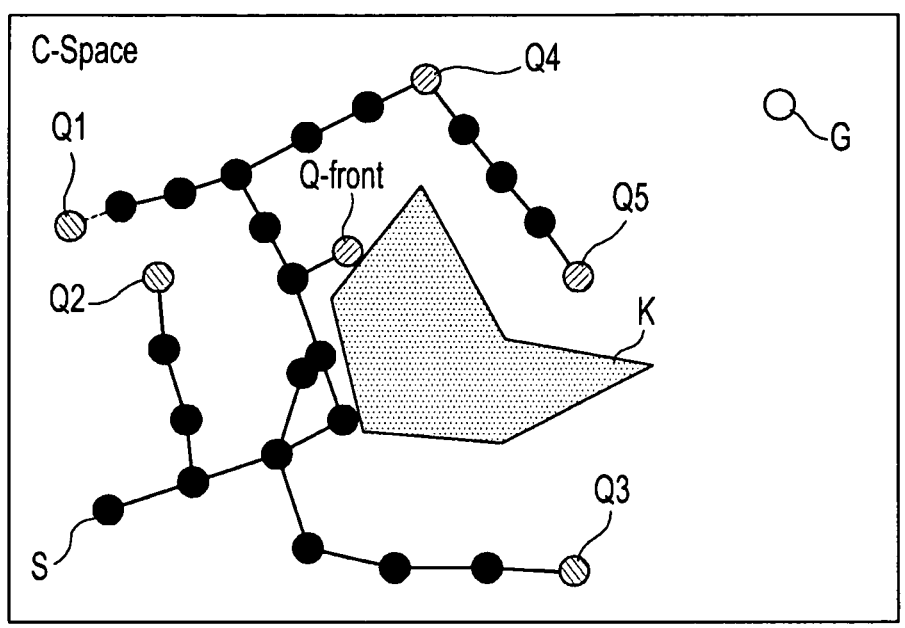
Figure 26:
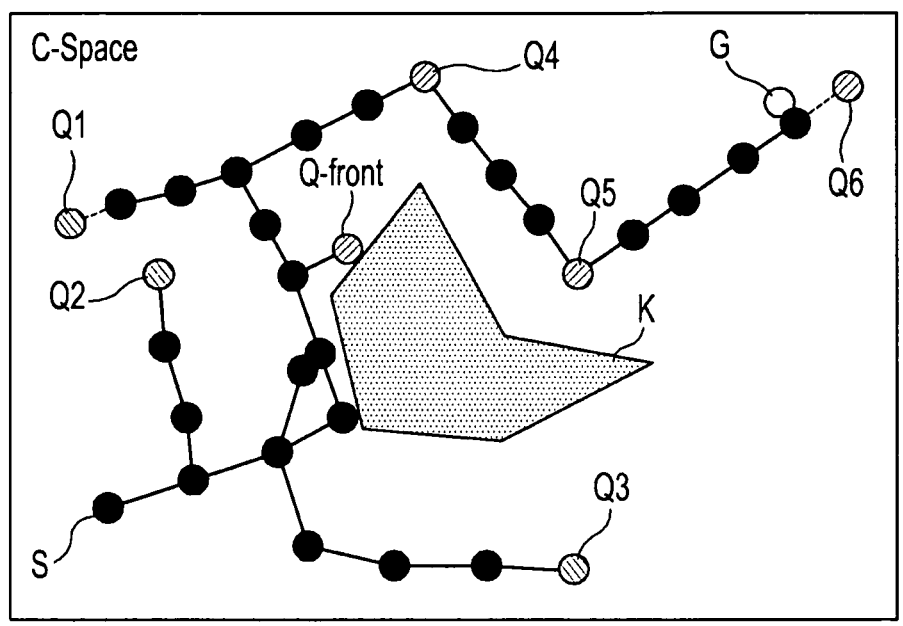
Figure 27:
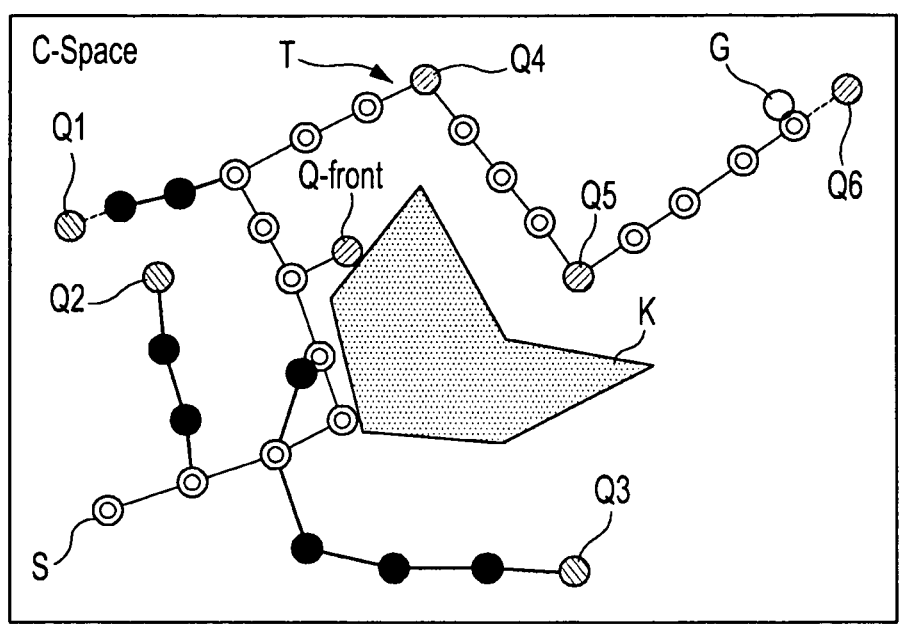

As shown in FIG. 22, if local minima occur while the tree is expanded, a certain point is randomly selected and is then connected to a closest node, as shown in FIG. 23.

As shown in FIGS. 24 to 27, if local minima continuously occur, the tree is expanded from the existing tree in a certain direction, a closest node is selected and the tree is connected again. If local minima do not occur, Operations 1, 2 and 3 are performed, a certain point is randomly sampled and selected in the C-Space, a node having a smallest goal score in the tree is selected, and the selected node and the certain point are connected. If the goal condition is satisfied while Operations 1, 2 and 3 are repeated, the final node is recognized as the goal point and a path is generated by graph searching.

In the above-described method, the search space is increased as in the Single-RRT due to the characteristics in which a certain point is randomly selected so as to expand the tree when local minima occur as shown in FIGS. 24 to 27.

Therefore, time consumed to obtain a final solution may be increased.

In contrast, if the goal function is changed and new directional vectors are applied when local minima occur, the solution of the inverse kinematics may be more efficiently obtained.

In more detail, while Operations 1, 2 and 3 of the BF-RRT are performed,

Operation 4: It is determined whether local minima occur.

Operation 5: If local minima occur, a new directional vector having a predetermined angle between the goal point and an intermediate obstacle or between the goal point and a node falling in local minima is selected instead of the current approach direction, and a goal score is set again.

Operation 6: A point closest to a goal determined by the new goal score and a certain point are connected.

Operation 5-1: If local minima occur again, the directional vector is changed.

Operation 5-2: If there is no new directional vector, a certain directional vector is selected.

Operation 7: If a distance from the goal point is equal to or less than a predetermined distance, the goal score is set again using the directional vector of the existing end effector.

Operation 8: If the goal score satisfies the goal condition during expansion, the final node is recognized as the goal point and the graph searching algorithm is performed, thereby searching for a path.

Figure 28:
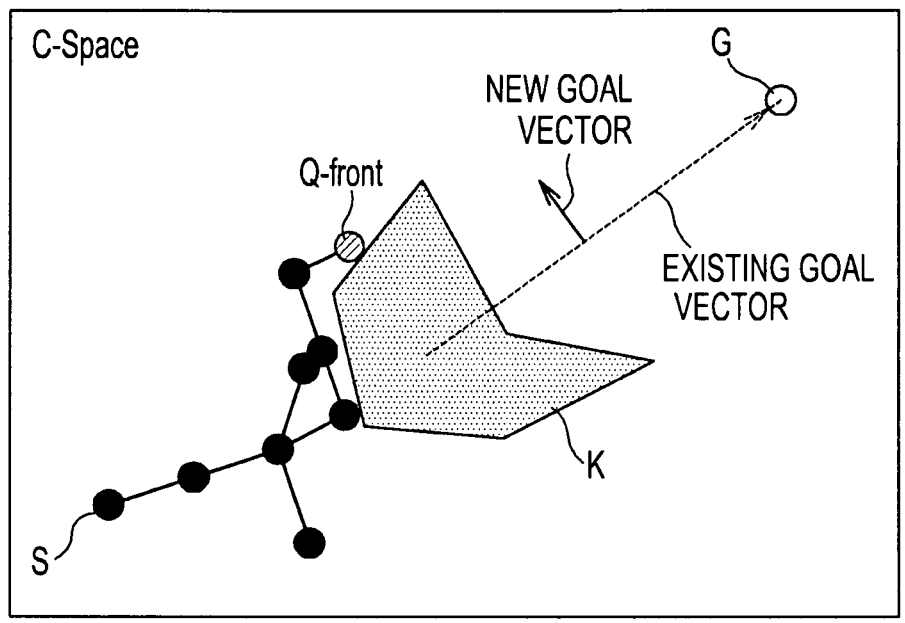
FIGS. 28 and 29 are views explaining a concept to escape from local minima when falling in local minima in a method of generating a path using an RF-RRT method in at least one embodiment.

As shown in FIG. 28, if local minima occurs while expansion is performed using the existing goal function, the existing goal vector is changed to a new goal vector.

Figure 29:
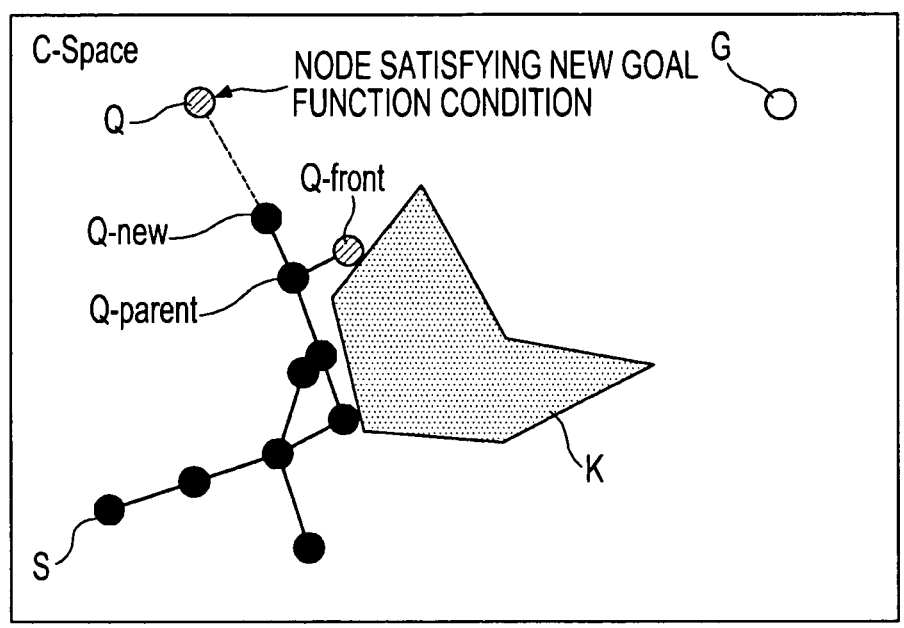

By applying the new goal vector, a new node Q-new having a smallest goal score is selected and is connected to an arbitrarily selected point Q (see FIG. 29).

Figure 30:
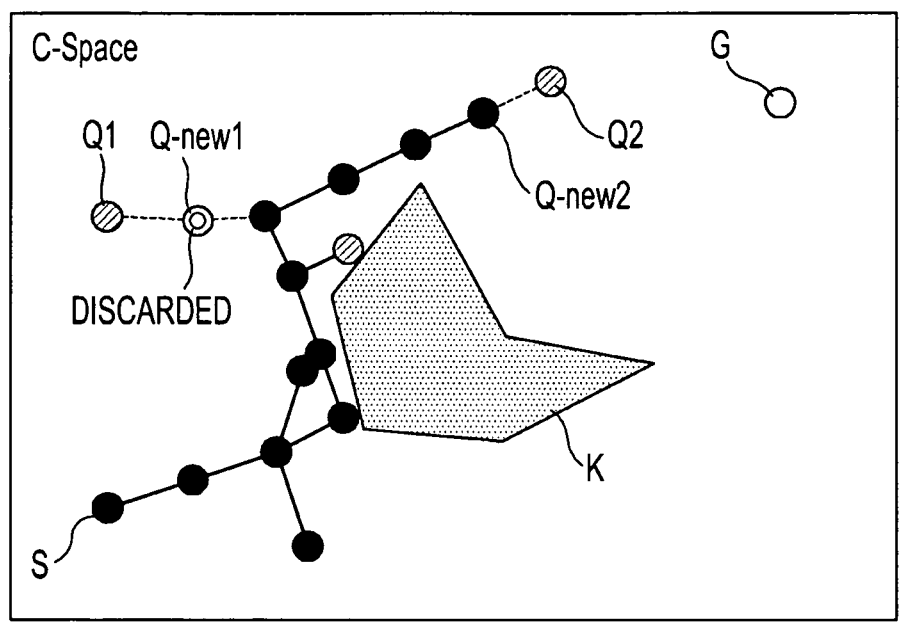
FIGS. 30 to 33 are views of a method of escaping from local minima and generating a path when falling in local minima in a method of generating a path using the RF-RRT method in at least one embodiment.

New nodes Q-new1, Q-new2 having small goal scores are selected (see FIG. 30).

Figure 31:
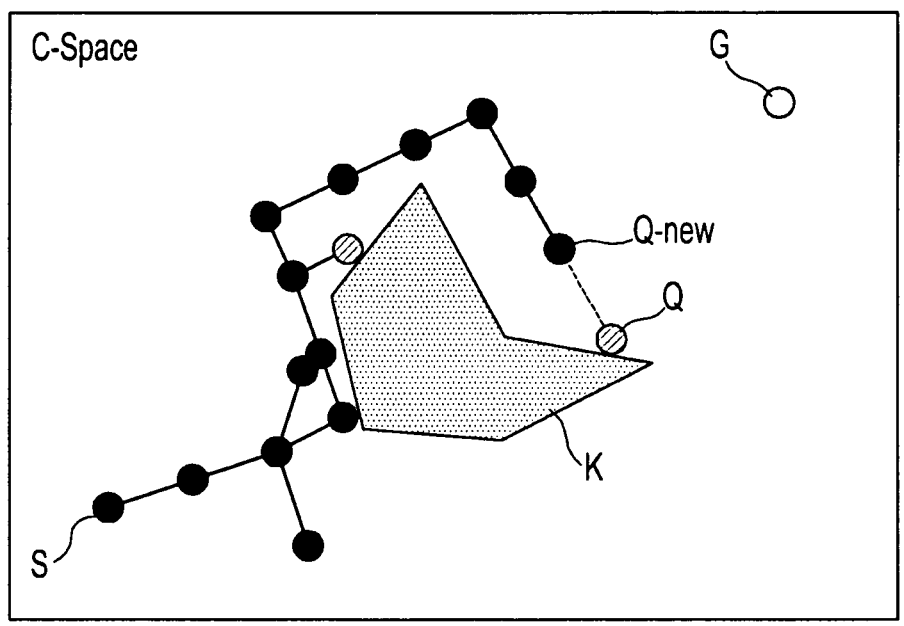

Subsequently, new nodes having small goal scores are selected (see FIG. 31).

Figure 32:
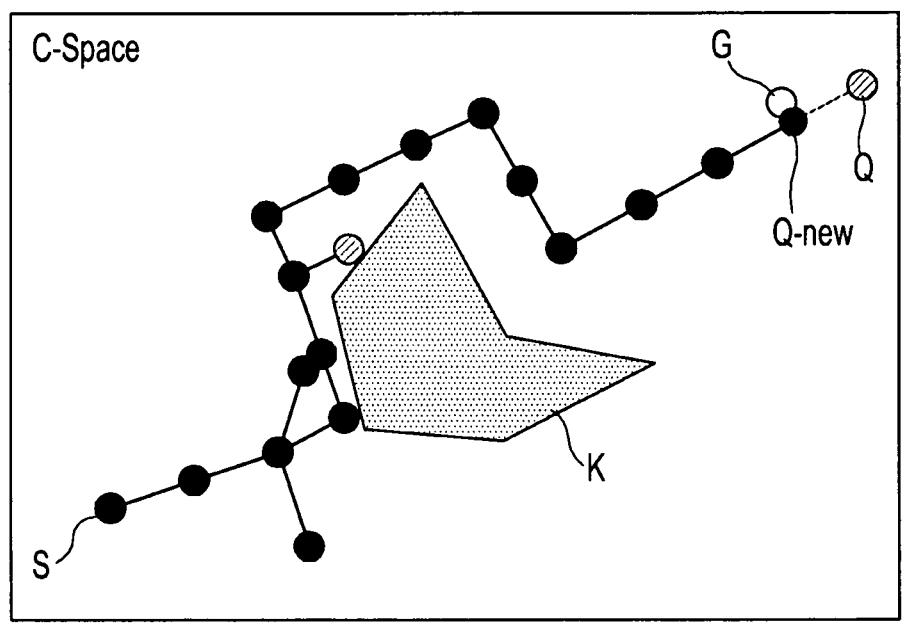

If a node is present within a predetermined distance from the goal point, the changed goal vector is changed to the goal vector prior to change and is connected (see FIG. 32).

Figure 33:
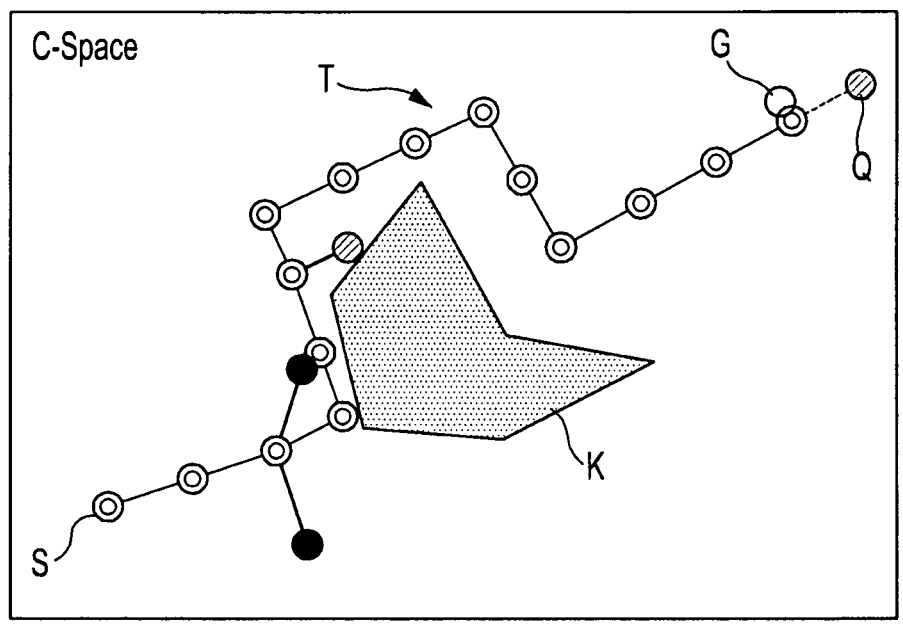

If the goal score converges to a predetermined value, the final node is recognized as the goal point and the path is searched for by graph searching (see FIG. 33).

Hereinafter, a method of changing the goal vector will be described.

There are various methods of setting the goal vector. Among them, a method of selecting a vector having a predetermined angle between an obstacle and a goal point (see FIG. 34) and a method of selecting a vector having a predetermined angle between an end effector falling in local minima and a goal point (see FIG. 35) will be described.

Both the above-described methods are stored. Next, if the first method fails, the second method may be selected.

The goal function is as follows.

$$\text{Goal Function} = \|G-H\| + \alpha |(G-H)x_H - 1|$$

where, $\|G-H\|$ denotes the distance from the end effector to the goal point, $|(G-H)*x_H - 1|$ denotes the directional vector, and $\alpha$ denotes a constant.

Among them, the portion "G–H" is called a goal vector.

The newly defined goal vector and goal function are determined by the following process.

Figure 34:
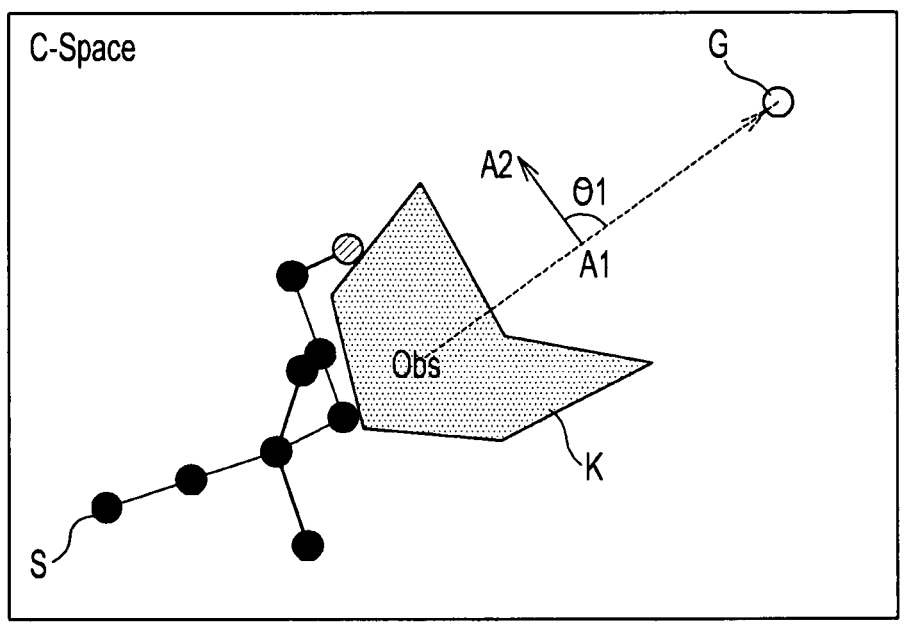
FIGS. 34 and 35 are views explaining in detail a concept to escape from local minima when falling in local minima in a method of generating a path using an RF-RRT method in at least one embodiment.

First, as shown in FIG. 34, in a method using an obstacle and a goal point, a new goal function is determined by the following equation.

$$\text{New Goal Function} = \|G-H\| + \alpha |A2 x_H - 1|$$

A1=Normalize (goal point−Obs)
θ1=a cos(A1·A2)

where, $|A2*x_H - 1|$ denotes the newly defined directional vector, $\|G-H\|$ denotes the distance from the end effector to the goal point, and $\alpha$ denotes a constant.

A1 denotes the directional vector between the center Obs of the obstacle and the goal point.

A2 denotes a new directional vector satisfying the above-described condition. Using this vector, the new goal function is set.

Figure 35:
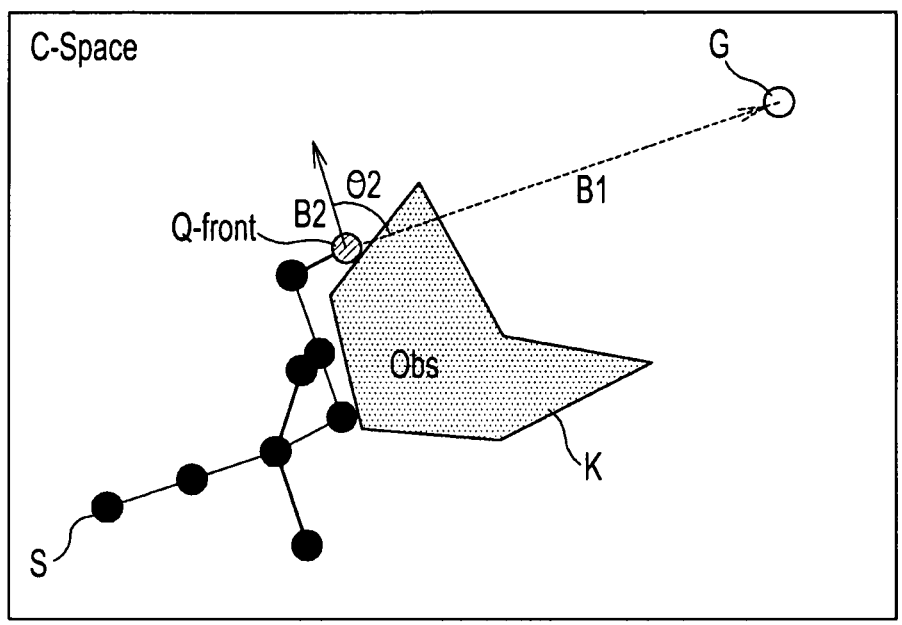

Meanwhile, as shown in FIG. 35, in a method using an end effector falling in local minima and a goal point, a new goal function is determined by the following equation.

$$\text{New Goal Function} = \|G-H\| + \alpha * |B2 * x_H - 1|$$

B1=Normalize (goal point−EE)
θ2=a cos(B1·B2)

where, $|B2*x_H - 1|$ denotes the newly defined directional vector, $\|G-H\|$ denotes the distance from the end effector to the goal point, and $\alpha$ denotes a constant.

B1 denotes the directional vector between the center Obs of the obstacle and the end effector.

B2 denotes a new directional vector satisfying the above-described condition. Using this vector, the new goal function is set.

At this time, if the end effector does not escape from local minima even when the changed directional vector is used, a random direction is selected or a closest point is selected so as to perform expansion.

Figure 36:
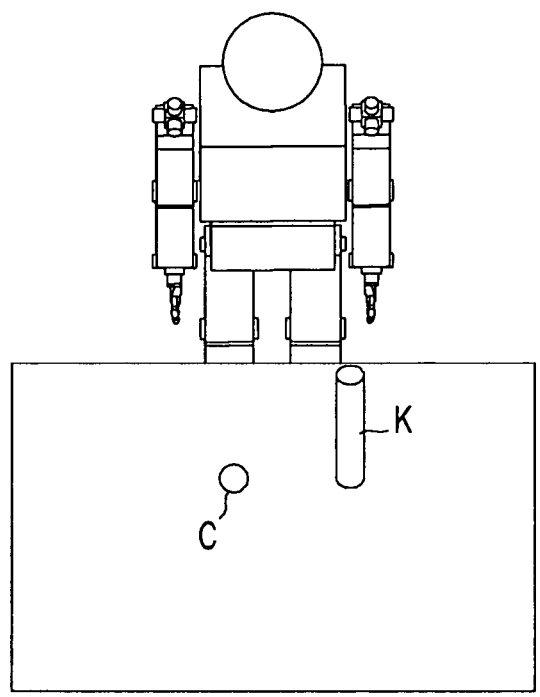
FIGS. 36 to 39 are views showing a simulation of a path plan suggested by the at least one embodiment in a working space.

FIG. 36 shows an initial condition and the shape of an obstacle K when the manipulator 130 grasps a ball which is an object C placed on a table while avoiding collision with a cylinder which is an obstacle.

Figure 37:
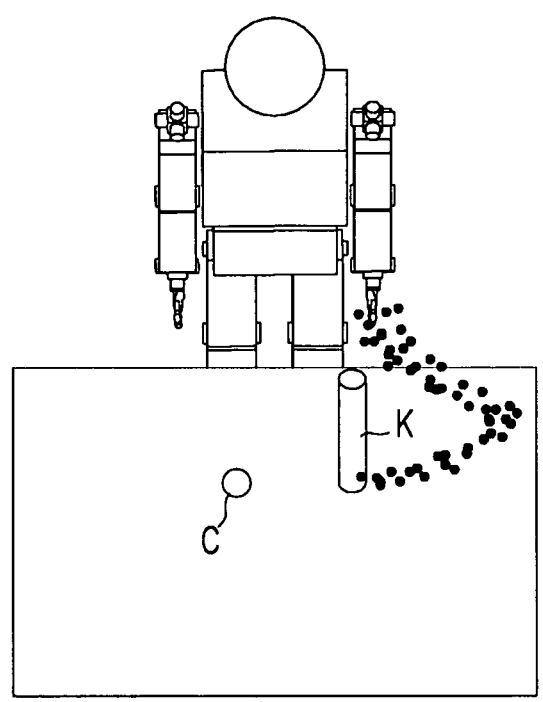

FIG. 37 shows the case where a tree representing a motion path is not expanded due to local minima when the manipulator 130 grasps a ball.

Figure 38:
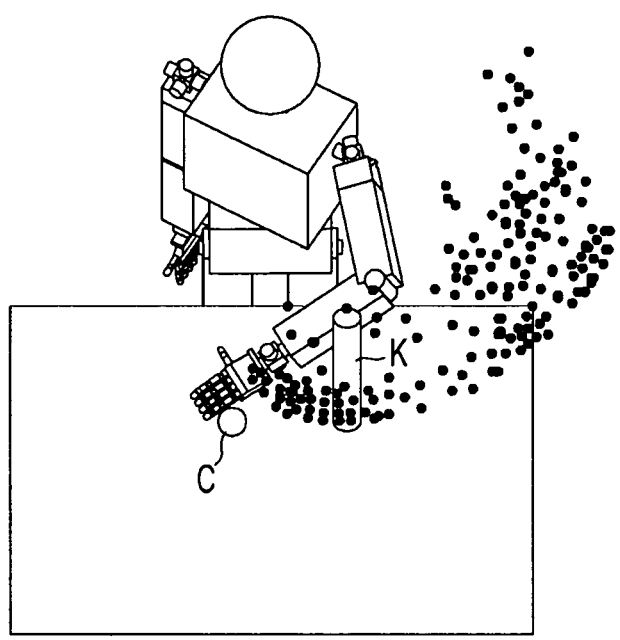

FIG. 38 shows the case where the manipulator 130 escapes from local minima through random escape such that the solution of inverse kinematics is obtained. In this case, the number of nodes generated is great and the motion path to avoid the cylinder is generated to become distant from the ball. Accordingly, a speed to obtain the solution of inverse kinematics is decreased and thus a time consumed to form the motion path is increased.

Figure 39:
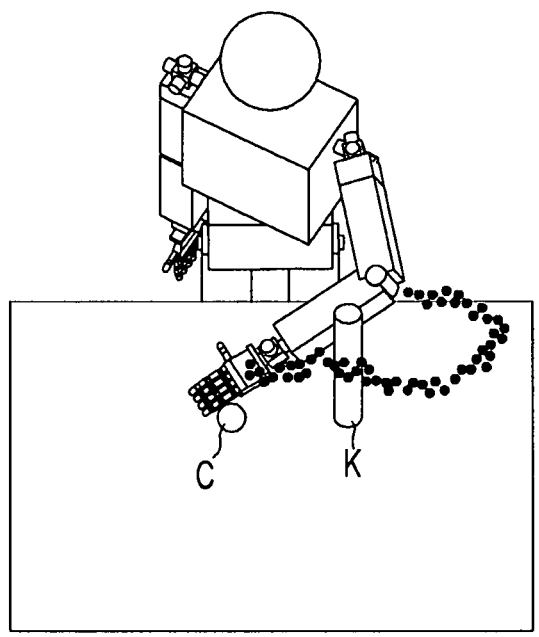

FIG. 39 shows the case where the manipulator 130 escapes from local minima by changing the goal function such that the solution of inverse kinematics is obtained. In this case, the number of nodes generated is small and the motion path to avoid the cylinder is generated so as to become close to the ball, compared with FIG. 38. Accordingly, a speed to obtain the solution of inverse kinematics is increased and thus a time consumed to form the motion path is decreased.

As described above, the solution of the inverse kinematics may be rapidly obtained by random searching or direction change when the solution of inverse kinematics is not obtained due to local minima or due to an inaccurate goal function.

Figure 40:
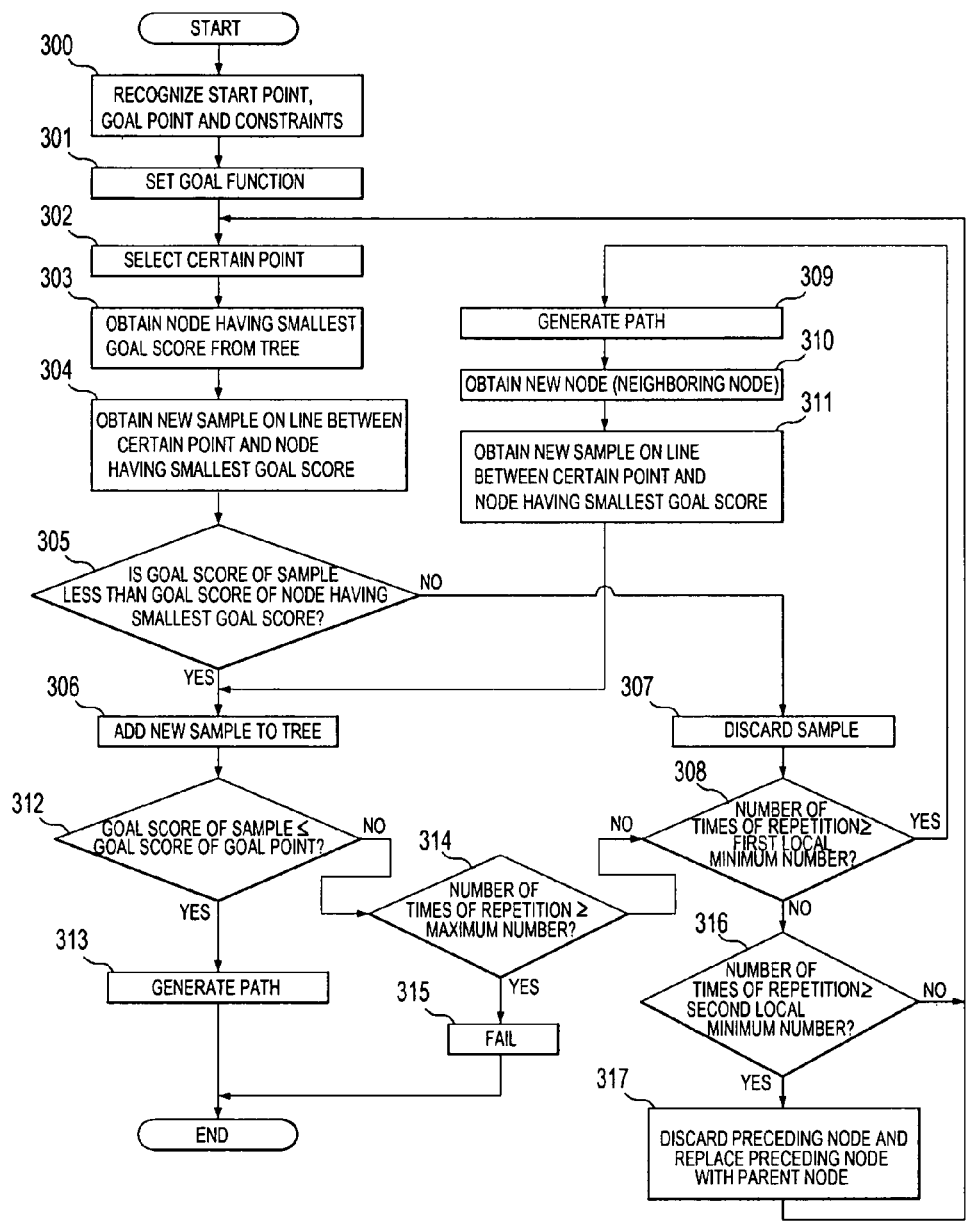
FIG. 40 is a flowchart illustrating a method of planning a motion path of a robot according to at least one embodiment.

FIG. 40 is a flowchart illustrating a method of planning a path of a robot according to an embodiment.

Referring to FIG. 40, the path planning generator 210 recognizes information given when the manipulator 130 performs the task command, that is, the configuration (start point S) at the initial position of the manipulator 130 before performing the task command, the configuration (goal point G) at the goal position of the manipulator 130 where the task command may be performed, and the constraints to avoid the obstacle between the start point S and the goal point G, in the C-Space using the recognizer 220 (300).

The path planning generator 210 sets the goal function which is the function according to the distance and direction difference between the start point S and the goal point G (301).

After setting the goal function, the path planning generator 210 selects a certain point which is randomly selected when the tree is generated in order to plan the path satisfying the constraints in the C-Space (302).

A node having a smallest goal score according to the goal function is obtained from the existing tree (303).

A new sample is obtained on a line connected between the selected certain point and the node having the smallest goal score in the existing tree (304).

In addition, the goal score of the new sample and the goal score of the node having the smallest goal score in the existing tree are compared to determine whether the goal score of the new sample is less than that of the node having the smallest goal score in the existing tree (305).

If it is determined that the goal score of the new sample is less than that of the node having the smallest goal score in the existing tree in Operation 305, the new sample is added to the tree (306).

In contrast, if it is determined that the goal score of the new sample is not less than that of the node having the smallest goal score in the existing tree in Operation 305, the new sample is discarded (307).

It is determined if the number of times of repeating the determination that the goal score of the new sample is not less than that of the node having the smallest goal score in the existing tree is equal to or greater than a first predetermined local minimum number (308). If the number of times of repetition is equal to or greater than the first predetermined local minimum number, it is determined that local minima occur and thus a certain point is randomly selected (309) and a node closest to the selected point in the tree is obtained as a new node on a line connected between the new node and the selected point (310). A new sample is obtained (311). The new sample is added to the tree (306).

In order to determine whether the new sample reaches the goal point after the new sample is added to the tree, the goal score of the new sample and the goal score of the goal point are compared to determine whether the goal score of the new sample is less than or equal to the goal point (312).

If it is determined that the goal score of the new sample is less than or equal to the goal point in Operation 312, it is determined that the new sample reaches the goal point and the motion path of the manipulator 130 is generated from several nodes on the tree (313).

Meanwhile, if the goal score of the new sample is greater than that of the goal point in Operation 312, it is determined that the new sample does not reach the goal point and determines whether the number of times of repeating the determination that the goal score of the new sample is greater than that of the goal point is equal to or greater than a predetermined maximum number (314). If it is determined that the number of times of repetition is equal to or greater than the predetermined maximum number in Operation 314, a warning to indicate that the generation of the path of the manipulator 130 of the robot fails is provided to the user (315). In contrast, if it is determined that the number of times of repetition is less than the predetermined maximum number in Operation 314, the method progresses to Operation 308 and determines whether the number of times of repetition is equal to or greater than the first predetermined local minimum number (308). If it is determined that the number of times of repetition is equal to or greater than the first predetermined local minimum number in Operation 308, it is determined that local minima occur. Then, in order to randomly select a certain point, the method progresses to Operation 309. Meanwhile, if it is determined that the number of times of repetition is less than the first predetermined local minimum number in Operation 308, it is determined whether the number of times of repetition is equal to or greater than a second predetermined local minimum number set to be less than the first predetermined local minimum number (316). If it is determined that the number of times of repetition is less than the second predetermined local minimum number in Operation 316, the method progresses to Operation 302 and the subsequent operations are performed. In contrast, if it is determined that the number of times of repetition is equal to or greater than the second predetermined local minimum number in Operation 316, the existing preceding node q_front is discarded and the preceding node q_front is replaced with the parent node of the preceding node q_front (317). Then, the method progresses to Operation 302 and the subsequent operations are performed.

After the motion path of the manipulator 130 of the robot is formed by the above-described method and the motion path of the manipulator 130 is searched for by the graph searching operation to generate a path plan, the robot controller 230 controls the driving unit 240 according to the generated path plan so as to control the motion of the manipulator 130.

Figure 41:
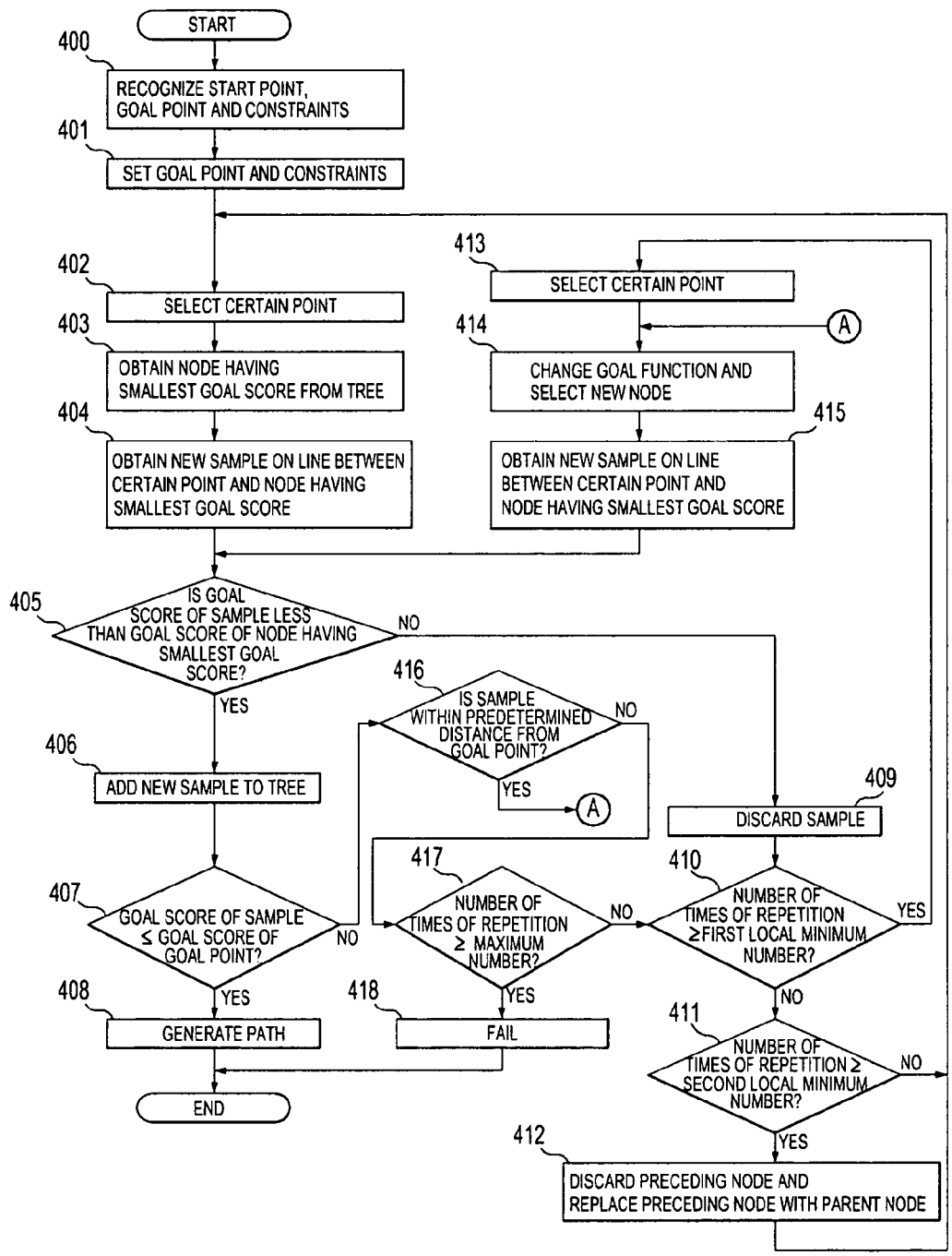
FIG. 41 is a flowchart illustrating a method of planning a motion path of a robot according to at least one embodiment.

FIG. 41 is a flowchart illustrating a method of planning a path of a robot according to an embodiment.

Referring to FIG. 41, the path planning generator 210 recognizes information given when the manipulator 130 performs the task command, that is, the configuration (start point S) at the initial position of the manipulator 130 before performing the task command, the configuration (goal point G) at the goal position of the manipulator 130 where the task command may be performed, and the constraints to avoid the obstacle between the start point S and the goal point G, in the C-Space using the recognizer 220 (400).

The path planning generator 210 sets the goal function which is the function according to the distance and direction difference between the start point S and the goal point G (401).

After setting the goal function, the path plan generator 210 selects a certain point which is randomly selected when the tree is generated in order to plan the path satisfying the constraints in the C-Space (402).

A node having a smallest goal score according to the goal function is obtained from the existing tree (403).

A new sample is obtained on a line connected between the selected certain point and the node having the smallest goal score in the existing tree (404).

In addition, the goal score of the new sample and the goal score of the node having the smallest goal score in the existing tree are compared to determine whether the goal score of the new sample is less than that of the node having the smallest goal score in the existing tree (405).

If it is determined that the goal score of the new sample is less than that of the node having the smallest goal score in the existing tree in Operation 405, the new sample is added to the tree (406).

In contrast, if it is determined that the goal score of the new sample is not less than that of the node having the smallest goal score in the existing tree in Operation 405, the new sample is discarded (409).

It is determined whether the number of times of repeating the determination that the goal score of the new sample is not less than that of the node having the smallest goal score in the existing tree is equal to or greater than a first predetermined local minimum number (410). If the number of times of repetition is equal to or greater than the first predetermined local minimum number, it is determined that local minima occur and thus a certain point is randomly selected (413). Then, the current goal function is changed to a predetermined new goal function and, when the changed goal function is applied, a node having a smallest goal score is obtained from the existing tree by the changed function as a new node (414). A new sample is obtained on a line connected between the new node and the selected point (415). Then, the goal score of the new sample and the goal score of the node having the smallest goal score in the existing tree are compared to determine whether the goal score of the new sample is less than that of the node having the smallest goal score in the existing tree (405).

If it is determined that the goal score of the new sample is less than the goal score of the node having the smallest goal score in the tree in Operation 405, the new sample is added to the tree (406).

In order to determine whether the new sample reaches the goal point after the new sample is added to the tree, the goal score of the new sample and the goal score of the goal point are compared so as to determine whether the goal score of the new sample is less than or equal to that of the goal point (407). If it is determined that the goal score of the new sample is less than or equal to the goal score of the goal point in Operation 407, it is determined that the new sample reaches the goal point and the motion path of the manipulator 130 is generated from several nodes on the tree (408).

Meanwhile, if the goal score of the new sample is greater than that of the goal point in Operation 407, it is determined whether the added new sample is within a predetermined distance from the goal point (416). If the added new sample is within the predetermined distance from the goal point, the method progresses to Operation 414 of changing the goal function to an original goal function and the subsequent operations are then performed.

In contrast, if the added new sample is not within the predetermined distance from the goal point, it is determined whether the number of times of repeating the determination that the goal score of the new sample is greater than that of the goal point is equal to or greater than a predetermined maximum number (417). If it is determined that the number of times of repetition is equal to or greater than the predetermined maximum number in Operation 417, a warning in which the generation of the path of the manipulator 130 of the robot fails is given to the user (418)

In contrast, if it is determined that the number of times of repetition is less than the predetermined maximum number in Operation 417, the method progresses to Operation 410 of determining whether the number of times of repetition is equal to or greater than a first predetermined local minimum number (410). If it is determined that the number of times of repetition is equal to or greater than the first predetermined local minimum number in Operation 410, it is determined that local minima occur. Then, in order to randomly select a certain point, the method progresses to Operation 413.

Meanwhile, if it is determined that the number of times of repetition is less than the first predetermined local minimum number in Operation 410, it is determined whether the number of times of repetition is equal to or greater than a second predetermined local minimum number set to be less than the first predetermined local minimum number (411). If it is determined that the number of times of repetition is less than the second predetermined local minimum number in Operation 411, the method progresses to Operation 402 and the subsequent operations are performed.

In contrast, if it is determined that the number of times of repetition is equal to or greater than the second predetermined local minimum number in Operation 411, the existing preceding node Q-front is discarded and the preceding node Q-front is replaced with the parent node of the preceding node Q-front (412). Then, the method progresses to Operation 402 and the subsequent operations are performed.

After the motion path of the manipulator 130 of the robot is formed by the above-described method and the motion path of the manipulator 130 is searched for by the graph searching operation to generate a path plan, the robot controller 230 controls the driving unit 240 according to the generated path plan to control the motion of the manipulator 130.

One or more of units/hardware described in the application may also be configured to act as one or more software modules in order to perform the operations of the above-described embodiments and may cause a general purpose computer or processor or a particular machine to perform any of the operations discussed above.

Aspects of the present at least one embodiment can also be embodied as computer-readable codes on a computer-readable medium. Also, codes and code segments to accomplish the present at least one embodiment can be easily construed by programmers skilled in the art to which the present invention pertains. The computer-readable medium may be a computer-readable storage medium, which is any data storage device that can store data which can be thereafter read by a computer system or computer code processing apparatus. Examples of the computer-readable storage medium include read-only memory (ROM), random-access memory (RAM), CD-ROMs, magnetic tapes, floppy disks, and optical data storage devices. The computer-readable medium can also be distributed over network-coupled computer systems so that the computer-readable code is stored and executed in a distributed fashion.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of planning a motion path of a robot, comprising:
    planning a motion path of a robot by use of a processor through a first method before it is determined that local minima occur, the first method comprising a Best First Search And Rapidly Random Tree (BF-RRT), and the BF-RRT including forming a configuration space having information about a start point, a goal point, constraints and a goal function, expanding a tree using a certain point selected in the configuration space and a node having a smallest goal score in the tree, and planning the path of a manipulator of the robot:
    determining whether the local minima occur when the tree is expanded using a processor; and
    planning a motion path of a robot by use of a processor through a second method that is different from the first method when it is determined that the local minima occur, the second method comprising a Single-Rapidly Random Tree (Single-RRT), wherein the performing of the Single-RRT comprises selecting the certain point in the configuration space, selecting a node closest to the certain point in the tree, obtaining a sample satisfying the constraints in a line between the selected certain point and the selected node, adding the obtained sample to the tree, and expanding the tree having the added obtained sample.

2. The method according to claim 1, wherein the determining of whether the local minima occur includes determining whether a goal score of a next node is greater than that of a previous node, and determining that the local minima occur when a number of times of repeating determining that a goal score of a next node is greater than that of a previous node is equal to or greater than a predetermined number.

3. The method according to claim 2, wherein the obtaining of the sample satisfying the predetermined goal score condition includes comparing the goal score of the sample with the goal score of the previous node and determining that the sample satisfies the predetermined goal score condition when the goal score of the sample is less than that of the previous node.

4. A method of planning a path of a robot, the method including forming a configuration space having information about a start point, a goal point, constraints and a goal function, expanding a tree using a certain point selected in the configuration space and a node having a smallest goal score in the tree, and planning the path of a manipulator of the robot, the method comprising:
    determining whether local minima occur when the tree is expanded using a processor;
    changing the goal function to a new goal function when the local minima occur, using the processor;
    applying the changed goal function and selecting a node having a smallest goal score in the tree using the processor;
    selecting the certain point in the configuration space using the processor; and
    obtaining a sample satisfying the constraints and a predetermined goal score condition in a line between the selected certain point and the selected node, adding the obtained sample to the tree, and expanding the tree having the added obtained sample, using the processor,
    wherein the changing of the goal function includes at least one of selecting a directional vector having a predetermined angle between an obstacle and the goal point to change the goal function, and selecting a directional vector having a predetermined angle between the goal point and an end effector of the manipulator falling in the local minima to change the goal function.

5. The method according to claim 4, wherein the determining of whether the local minima occur includes determining whether a goal score of a next node is greater than that of a previous node, and determining that the local minima occur when a number of times of repeating determining that a goal score of a next node is greater than that of a previous node is equal to or greater than a predetermined number.

6. An apparatus to plan a motion path of a robot, comprising:
 a path planning generator using a processor to plan a motion path of a robot through a first method before it is determined that local minima occur, to determine whether the local minima occur when a tree is expanded, and to plan a motion path of a robot through a second method that is different from the first method when it is determined that the local minima occur, the first method comprising a Best First Search And Rapidly Random Tree (BF-RRT) and the second method comprising a Single-Rapidly Random Tree (Single-RRT),
 wherein the BF-RRT comprises forming a configuration space having information about a start point, a goal point, constraints and a goal function, expanding the tree using a certain point selected in the configuration space and a node having a smallest goal score in the tree, and planning the path of a manipulator of the robot, and
 wherein the Single-RRT comprises selecting the certain point in the configuration space, selecting a node closest to the selected certain point in the tree, obtaining a sample satisfying the constraints in a line between the certain point and the selected node, adding the obtained sample to the tree, and expanding the tree having the added obtained sample.

7. An apparatus to plan a path of a robot, the apparatus forming a configuration space having information about a start point, a goal point, constraints and a goal function, expanding a tree using a certain point selected in the configuration space and a node having a smallest goal score in the tree, and planning the path of a manipulator of the robot, the apparatus comprising:
 a path planning generator using a processor to determine whether local minima occur when the tree is expanded, to change the goal function to a new goal function when the local minima occur, to apply the changed goal function to select a node having a smallest goal score in the tree, to select the certain point in the configuration space, and to obtain a sample satisfying the constraints and a predetermined goal score condition in a line between the selected certain point and the selected node to add the obtained sample to the tree such that the tree is expanded,
 wherein the path planning generator performs at least one of selecting a directional vector having a predetermined angle between an obstacle and the goal point to change the goal function, and selecting a directional vector having a predetermined angle between the goal point and an end effector of the manipulator falling in the local minima to change the goal function.

* * * * *

UNITED STATES PATENT AND TRADEMARK OFFICE
CERTIFICATE OF CORRECTION

PATENT NO.       : 8,825,209 B2
APPLICATION NO.  : 12/805271
DATED            : September 2, 2014
INVENTOR(S)      : Myung Hee Kim et al.

Page 1 of 1

It is certified that error appears in the above-identified patent and that said Letters Patent is hereby corrected as shown below:

In the Claims

Column 14, Line 30, In Claim 1, delete "sample." and insert -- sample, wherein the changing of the goal function includes at least one of selecting a directional vector having a predetermined angle between an obstacle and the goal point to change the goal function, and selecting a directional vector having a predetermined angle between the goal point and an end effector of the manipulator falling in the local minima to change the goal function. --, therefor.

Column 15, Line 13-15, In Claim 6, delete "An apparatus to plan a motion path of a robot, comprising: a path planning generator using a processor to plan" and insert -- A Path Planning Generator, including a processor, configured to plan a motion path of a robot, comprising: --, therefor.

Column 16, Line 5, In Claim 6, delete "sample." and insert -- sample, wherein the changing of the goal function includes at least one of selecting a directional vector having a predetermined angle between an obstacle and the goal point to change the goal function, and selecting a directional vector having a predetermined angle between the goal point and an end effector of the manipulator falling in the local minima to change the goal function. --, therefor.

Signed and Sealed this
Twenty-third Day of December, 2014

Michelle K. Lee
*Deputy Director of the United States Patent and Trademark Office*